(12) United States Patent
Iwamitsu et al.

(10) Patent No.: US 11,623,632 B2
(45) Date of Patent: Apr. 11, 2023

(54) VEHICLE CONTROL DEVICE AND VEHICLE

(71) Applicant: HONDA MOTOR CO., LTD., Tokyo (JP)

(72) Inventors: Atsuki Iwamitsu, Wako (JP); Yuki Nakada, Wako (JP); Takumi Kawano, Wako (JP); Takaaki Kuwabara, Wako (JP); Shigeki Kazehare, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 16/992,570

(22) Filed: Aug. 13, 2020

(65) Prior Publication Data

US 2021/0046920 A1 Feb. 18, 2021

(30) Foreign Application Priority Data

Aug. 14, 2019 (JP) .............................. JP2019-148769

(51) Int. Cl.
  *B60W 20/13* (2016.01)
  *B60W 20/30* (2016.01)
  (Continued)

(52) U.S. Cl.
  CPC ............ *B60W 20/13* (2016.01); *B60W 20/30* (2013.01); *B60W 30/06* (2013.01); *B60W 30/18036* (2013.01)

(58) Field of Classification Search
  CPC ...... B60W 20/13; B60W 20/30; B60W 30/06; B60W 30/18036; B60W 10/06;
  (Continued)

(56) References Cited

U.S. PATENT DOCUMENTS

2011/0022255 A1* 1/2011 Yamada .................... B60K 6/46
  180/65.265
2013/0073136 A1* 3/2013 Yamamoto ............ B60W 10/06
  180/65.23
(Continued)

FOREIGN PATENT DOCUMENTS

JP  2011-079379 A  4/2011
JP  5810150 B2  11/2015
JP  6080239 B2  2/2017

*Primary Examiner* — Adam R Mott
*Assistant Examiner* — Erick T. Detweiler
(74) *Attorney, Agent, or Firm* — Carrier Shende & Associates, P.C.; Joseph P. Carrier; Jeffrey T. Gedeon

(57) ABSTRACT

A vehicle control device includes a control unit. In a state where a first electric motor generates electricity by rotating an internal combustion engine and a target driving force is decided based on an operation for an accelerator pedal, the control unit performs a first driving control in which driving of a vehicle by a first driving force, which is a driving force of a first driving device including the internal combustion engine and the first electric motor, is prioritized. In a state where the first electric motor generates electricity by rotating the internal combustion engine and the target driving force is decided without being based on the operation for the accelerator pedal, the control unit performs a second driving control in which driving of the vehicle by a second driving force, which is a driving force of a second driving device including a second electric motor, is prioritized.

10 Claims, 25 Drawing Sheets

(51) Int. Cl.
*B60W 30/18* (2012.01)
*B60W 30/06* (2006.01)

(58) Field of Classification Search
CPC ...... B60W 10/08; B60W 20/15; B60W 20/20; B60W 2510/244; B60W 2540/10; B60W 2710/083; B60W 30/00; B60W 20/40; B60W 10/02; B60W 20/00; B60W 2420/42; B60W 20/10; B60W 10/023; B60W 30/18127; B60W 2552/15; B60W 10/026; B60W 10/10; B60W 10/20; B60W 10/04; B60W 10/30; B60W 30/20; B60W 50/14; B60W 10/115; B60W 2554/00; B60W 30/18118; B60W 10/11; B60W 2540/12; B60W 20/14; B60W 40/08; B60W 2420/52; B60W 2710/06; B60W 30/09; B60W 30/0956; B60W 10/18; B60W 2030/206; B60W 2555/20; B60W 2555/60; B60W 2030/1809; B60W 2510/0275; B60W 30/18027; B60W 20/12; B60W 2556/50; B60W 2720/106; B60W 2520/10; B60W 2710/027; B60W 50/06; B60W 10/196; B60W 30/18163; B60W 2710/08; B60W 2710/1005; B60W 30/18136; B60W 60/001; B60W 2556/65; B60W 10/00; B60W 10/184; B60W 2510/0638; B60W 2540/22; B60W 2720/125; B60W 2555/40; B60W 2710/021; B60W 2710/18; B60W 2720/12; B60W 30/18145; B60W 2510/083; B60W 2710/20; B60W 30/18; B60W 2050/146; B60W 2556/45; B60W 30/085; B60W 30/095; B60W 2050/0075; B60W 2710/024; B60W 30/182; B60W 40/02; Y02T 10/62; Y02T 10/70; Y02T 10/72; B60K 6/52; B60K 6/448; G05D 1/0088; G05D 2201/0213; G05D 1/0217; G05D 1/0223

See application file for complete search history.

(56) References Cited

U.S. PATENT DOCUMENTS

| | | | |
|---|---|---|---|
| 2015/0258983 A1* | 9/2015 | Kimura | B60K 6/547 903/902 |
| 2015/0375610 A1 | 12/2015 | Okubo et al. | |
| 2016/0325725 A1* | 11/2016 | Yang | B60W 10/08 |
| 2018/0148063 A1* | 5/2018 | Tatsushiro | B60W 30/18009 |

* cited by examiner

VEHICLE CONTROL DEVICE AND VEHICLE

CROSS-REFERENCE TO RELATED APPLICATION

This application is based upon and claims the benefit of priority from Japanese Patent Application No. 2019-148769 filed on Aug. 14, 2019, the contents of which are incorporated herein by reference.

BACKGROUND OF THE INVENTION

Field of the Invention

The present invention relates to a vehicle control device and a vehicle.

Description of the Related Art

Japanese Patent No. 5810150 discloses a vehicle including a first driving device and a second driving device. The first driving device includes an internal combustion engine, a first electric motor, and a transmission. The second driving device includes a second electric motor.

SUMMARY OF THE INVENTION

There is a demand to further improve the riding comfort of the vehicle.

An object of the present invention is to provide a vehicle control device and a vehicle that can improve the riding comfort.

A vehicle control device according to one aspect of the present invention controls a vehicle including a first driving device, a second driving device, and an energy storage device, the first driving device including an internal combustion engine and a first electric motor configured to generate electricity by being rotated by the internal combustion engine, the first driving device being configured to drive one set of a set of first driving wheels and a set of second driving wheels through a transmission; the second driving device including a second electric motor and being configured to drive the other set of the set of first driving wheels and the set of second driving wheels; the energy storage device being configured to store electric power supplied from the first electric motor and supply the electric power to the first electric motor and the second electric motor, and the vehicle control device includes: a target driving force decision unit configured to decide a target driving force of the vehicle; and a control unit configured to control at least one of a first driving force, which is a driving force of the first driving device, and a second driving force, which is a driving force of the second driving device, based on the target driving force, and when the amount of electric power stored in the energy storage device has become less than an electric power amount threshold, cause the first electric motor to generate electricity by rotation of the internal combustion engine. In a state where the first electric motor generates electricity by rotation of the internal combustion engine and the target driving force is decided by the target driving force decision unit based on user's operation for an accelerator pedal, the control unit is configured to perform a first driving control in which driving of the vehicle by the first driving force is prioritized, and in a state where the first electric motor generates electricity by rotation of the internal combustion engine and the target driving force is decided by the target driving force decision unit without being based on the user's operation for the accelerator pedal, the control unit is configured to perform a second driving control in which driving of the vehicle by the second driving force is prioritized.

A vehicle according to another aspect of the present invention includes the above vehicle control device.

According to the present invention, it is possible to provide the vehicle control device and the vehicle that can improve the riding comfort.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a vehicle control device and a vehicle according to the present invention are hereinafter described in detail with reference to the attached drawings.

First Embodiment

Figure 1:
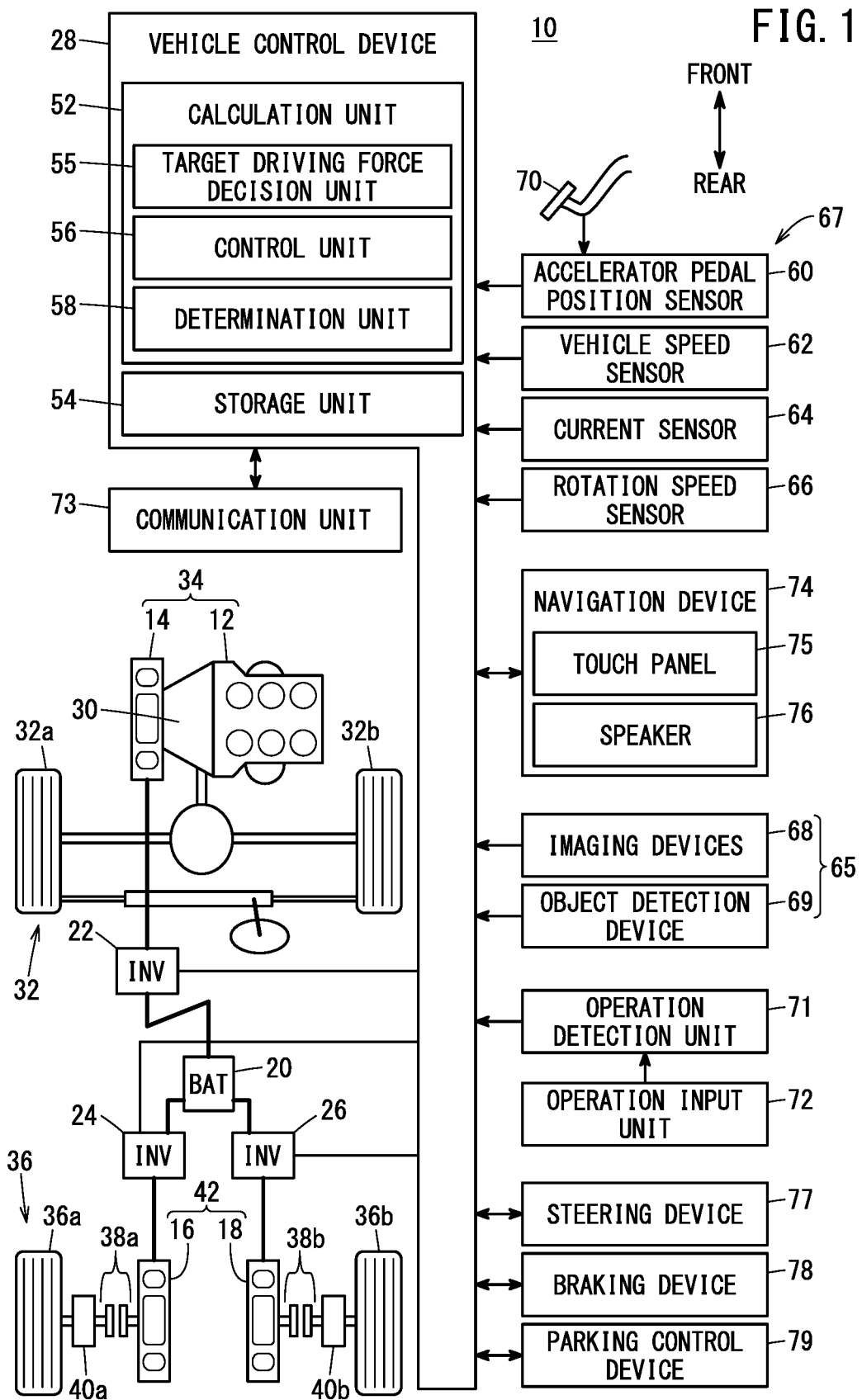
FIG. 1 is a schematic diagram illustrating a vehicle according to a first embodiment.

A vehicle control device and a vehicle according to a first embodiment are described with reference to the drawings. FIG. 1 is a schematic diagram illustrating the vehicle according to the present embodiment.

As illustrated in FIG. 1, a vehicle 10 includes first driving wheels (a set of first driving wheels) (front wheels) 32 and second driving wheels (a set of second driving wheels) (rear wheels) 36. The first driving wheels 32 include a left-front wheel (front wheel) 32a and a right-front wheel (front wheel) 32b. The second driving wheels 36 include a left-rear wheel (rear wheel) 36a and a right-rear wheel (rear wheel) 36b.

The vehicle 10 further includes a first driving device 34. The first driving device 34 includes an internal combustion engine (engine) 12 and a first electric motor (motor) 14. The maximum driving force of the first driving device 34 is greater than the maximum driving force of a second driving device 42 to be described below. The first electric motor 14 can assist the internal combustion engine 12 and generate electricity by being rotated by the internal combustion engine 12. As the internal combustion engine 12, for example, a six-cylinder engine can be used; however, the internal combustion engine 12 is not limited thereto. As the internal combustion engine 12, for example, a two-cylinder engine, a four-cylinder engine, an eight-cylinder engine, or an engine with more than eight cylinders may be used. In addition, the internal combustion engine 12 is not limited to a gasoline engine and may be a diesel engine or the like. The first electric motor 14 can be a three-phase AC (alternate current) brushless type motor, for example; however, the first electric motor 14 is not limited thereto. As the first electric motor 14, for example, a three-phase AC brush type motor, a single-phase AC type motor, and a DC type motor may be used.

The vehicle 10 further includes a transmission 30. The first driving device 34 can transmit driving force (first driving force) to the first driving wheels 32 through the transmission 30. In this example, the first driving device 34 and the transmission 30 are provided on the front side of the vehicle 10; however, the structure thereof is not limited to this example. The first driving device 34 and the transmission 30 may be provided on the rear side of the vehicle 10. If the first driving device 34 and the transmission 30 are provided on the rear side of the vehicle 10, the first driving device 34 can transmit the driving force to the second driving wheels 36 through the transmission 30.

Figure 2:
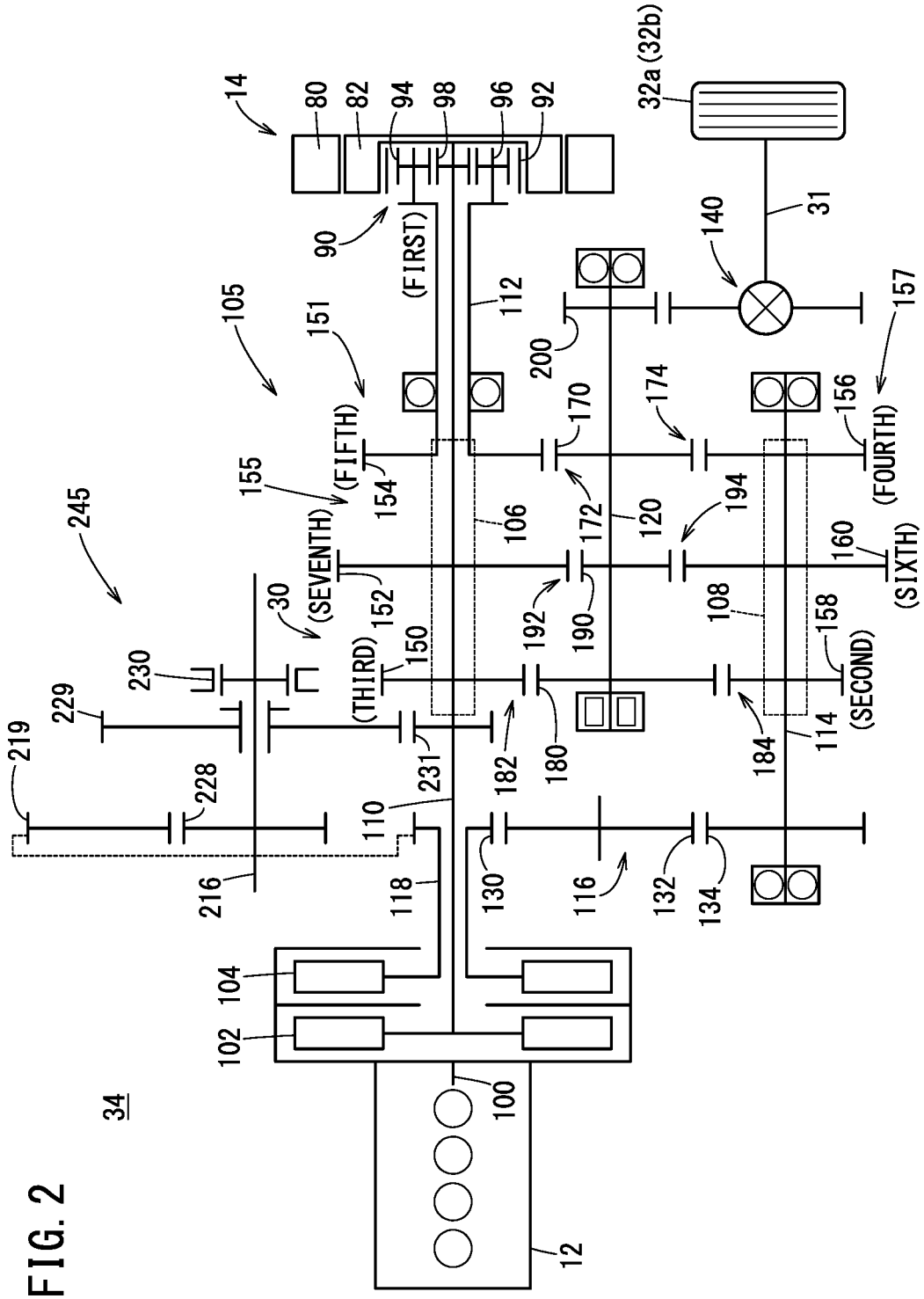
FIG. 2 is a schematic diagram illustrating a first driving device that is provided on the vehicle according to the first embodiment.

FIG. 2 is a schematic diagram illustrating the first driving device that is provided on the vehicle according to the present embodiment. The detailed structure of the first driving device 34 is disclosed, for example, in Japanese Laid-Open Patent Publication No. 2011-079379, Japanese Patent No. 6080239, and the like. Thus, the outline of the structure is described below.

As illustrated in FIG. 2, the first electric motor 14 includes a stator 80 and a rotor 82. The stator 80 is formed in a manner that a coil is wound on a stator core. The rotor 82 includes a permanent magnet that is not shown. This permanent magnet is disposed so as to face the stator 80.

The transmission 30 includes a planetary gear mechanism 90. The planetary gear mechanism 90 is provided on one end, that is, a shaft end of a main shaft 110 to be described below. The planetary gear mechanism 90 includes a ring gear 92, planetary gears 94, 96, and a sun gear 98. The sun gear 98 is connected to the rotor 82. The planetary gear mechanism 90 constitutes a part of a transmission gear group 105 that is described below.

The transmission 30 is a dual clutch type transmission. The transmission 30 includes a first clutch 102, a second clutch 104, the transmission gear group 105, a first transmission actuator 106, and a second transmission actuator 108. The first clutch 102 and the second clutch 104 are connected to a crank shaft 100 of the internal combustion engine 12. The first transmission actuator 106 and the second transmission actuator 108 are used to change the transmission gear group 105, that is, change the gear position (shift of gear).

The transmission 30 further includes main shafts 110, 112, 114, 118, an idle gear train 116, and a counter shaft (output shaft) 120.

The crank shaft 100 of the internal combustion engine 12 and the main shaft (input shaft) 110 of the transmission 30 are positioned in the same axis. Motive power (driving force) from the internal combustion engine 12 is transmitted to the main shaft 110 through the first clutch 102.

The main shaft (connection shaft) 112 is formed by a hollow member. The motive power from the internal combustion engine 12 is transmitted to the main shaft 112 through the main shaft 110, the sun gear 98, and the planetary gears 94, 96.

The motive power from the internal combustion engine 12 is transmitted to the main shaft 114 through the second clutch 104.

The idle gear train 116 includes an idle driving gear 130, a first idle driven gear 132, and a second idle driven gear 134. The idle gear train 116 is connected to the main shaft 114. The main shaft 114 is a rotation shaft of the second idle driven gear 134.

The counter shaft 120 is disposed in parallel with the main shafts 110, 112, 114, 118. The counter shaft 120 drives the front wheels 32a, 32b through a differential gear mechanism 140 and an axle 31.

The transmission 30 includes two transmission shafts, that is, an odd-numbered gear-position transmission shaft and an even-numbered gear-position transmission shaft. The main shafts 110, 112 that constitute the odd-numbered gear-position transmission shaft include an odd-numbered position gear group 151. The odd-numbered position gear group 151 includes a third-position driving gear 150, a seventh-position driving gear 152, and a fifth-position driving gear 154. The vehicle 10 further includes a front stage clutch 155. The front stage clutch 155 can connect and disconnect the motive power between the odd-numbered position gear group 151 and the main shaft 110.

The main shafts 114, 118 that constitute the even-numbered gear-position transmission shaft include an even-numbered position gear group 157. The even-numbered position gear group 157 includes a fourth-position driving gear 156, a second-position driving gear 158, and a sixth-position driving gear 160.

For the convenience of description, FIG. 2 illustrates that the third-position driving gear 150, the seventh-position driving gear 152, and the fifth-position driving gear 154 are fixed to the main shafts 110, 112. In actuality, the third-position driving gear 150, the seventh-position driving gear 152, and the fifth-position driving gear 154 are not fixed to the main shafts 110, 112. The first transmission actuator 106 can selectively connect or disconnect the third-position driving gear 150, the seventh-position driving gear 152, and the fifth-position driving gear 154 to or from the main shafts 110, 112. The first transmission actuator 106 can control the transmission of a first gear, a third gear, a fifth gear, and a seventh gear.

For the convenience of description, FIG. 2 illustrates that the second-position driving gear 158, the sixth-position driving gear 160, and the fourth-position driving gear 156 are fixed to the main shaft 114. In actuality, the second-position driving gear 158, the sixth-position driving gear 160, and the fourth-position driving gear 156 are not fixed to the main shaft 114. The second transmission actuator 108 can selectively connect or disconnect the second-position driving gear 158, the sixth-position driving gear 160, and the fourth-position driving gear 156 to or from the main shaft 114.

The counter shaft 120 includes a first common driven gear 170. The first common driven gear 170 meshes with the fifth-position driving gear 154. The first common driven gear 170 and the fifth-position driving gear 154 form a fifth-position gear pair 172. The first common driven gear 170 meshes with the fourth-position driving gear 156. The first common driven gear 170 and the fourth-position driving gear 156 form a fourth-position gear pair 174.

The counter shaft 120 includes a second common driven gear 180. The second common driven gear 180 meshes with the third-position driving gear 150. The second common driven gear 180 and the third-position driving gear 150 form a third-position gear pair 182. The second common driven gear 180 meshes with the second-position driving gear 158. The second common driven gear 180 and the second-position driving gear 158 form a second-position gear pair 184.

The counter shaft 120 includes a third common driven gear 190. The third common driven gear 190 meshes with the seventh-position driving gear 152. The third common driven gear 190 and the seventh-position driving gear 152 form a seventh-position gear pair 192. The third common driven gear 190 meshes with the sixth-position driving gear 160. The third common driven gear 190 and the sixth-position driving gear 160 form a sixth-position gear pair 194.

The transmission 30 further includes an idle shaft 216. The idle shaft 216 includes a reverse drive gear 228. The reverse drive gear 228 meshes with an idle gear 219. The idle gear 219 is connected to the idle driving gear 130. The idle shaft 216 supports a reverse idle gear 229 in a rotatable manner. The main shaft 110 further includes a reverse driven gear 231. The reverse idle gear 229 meshes with the reverse driven gear 231. The transmission 30 further includes a reverse dog clutch 230. The reverse idle gear 229 can be connected to the idle shaft 216 by the reverse dog clutch 230.

The idle driving gear 130, the idle gear 219, the reverse drive gear 228, the idle shaft 216, the reverse dog clutch 230, the reverse idle gear 229, and the reverse driven gear 231 constitute a reversing means 245. The reversing means 245 reverses the rotation of the crank shaft 100 of the internal combustion engine 12, i.e., the rotation of the main shaft 118, and transmits this reversed rotation to the main shaft 110.

When the first clutch 102 is engaged, the motive power from the internal combustion engine 12 can be transmitted to the rotor 82 of the first electric motor 14 through the main shaft 110. Thus, when the first clutch 102 is engaged, the first electric motor 14 can be used as an electric generator. Note that the engagement of the first clutch 102 can be controlled by a vehicle control device 28 to be described below, for example.

When the first clutch 102 is engaged, the motive power from the internal combustion engine 12 can be transmitted to the first driving wheels 32 through the fifth-position driving gear 154, the third-position driving gear 150, or the seventh-position driving gear 152, and further through the counter shaft 120. Regardless of whether the first electric motor 14 generates electricity, the motive power from the internal combustion engine 12 can be transmitted to the first driving wheels 32.

When the second clutch 104 is engaged, the motive power from the internal combustion engine 12 can be transmitted to the main shafts 114, 118. Thus, when the second clutch 104 is engaged, the motive power from the internal combustion engine 12 can be transmitted to the first driving wheels 32 through the fourth-position driving gear 156, the second-position driving gear 158, or the sixth-position driving gear 160, and further through the counter shaft 120. Note that the engagement of the second clutch 104 can be controlled by the vehicle control device 28, for example.

When the vehicle 10 is driven by the first electric motor 14, that is, when the first electric motor 14 operates as an electric motor, rotation driving force of the rotor 82 is transmitted to the main shaft 110 through the planetary gear mechanism 90. The rotation driving force that has been transmitted to the main shaft 110 can be transmitted to the front wheels 32a, 32b through one of the fifth-position driving gear 154, the third-position driving gear 150, and the seventh-position driving gear 152, and further through the counter shaft 120.

The counter shaft 120 includes a final gear 200. The final gear 200 can be used by both the odd-numbered position gear group 151 and the even-numbered position gear group 157.

The first electric motor 14 can assist the motive power of the internal combustion engine 12. The first electric motor 14 can assist the motive power of the internal combustion engine 12 in a state where the gear is set to an even-numbered position, that is, in a state where the second clutch 104 is engaged. This is because the first clutch 102 is disengaged in the state where the gear is set to an even-numbered position, that is, in the state where the second clutch 104 is engaged. The rotor 82 that is provided on the first electric motor 14 is connected to the sun gear 98. The sun gear 98 is connected to the main shaft 110. Thus, the rotation driving force of the rotor 82 can be transmitted to the main shaft 110 through the sun gear 98. The motive power that has been transmitted to the main shaft 110 can be transmitted to the counter shaft 120 through the fifth-position driving gear 154, the third-position driving gear 150, or the seventh-position driving gear 152. As described above, the first electric motor 14 can assist the motive power of the internal combustion engine 12.

When regenerative power generation is performed, the first clutch 102 and the second clutch 104 are disengaged. In addition, when the vehicle 10 is driven by at least one of the first electric motor 14 and second electric motors 16, 18, the first clutch 102 and the second clutch 104 are disengaged. When the first clutch 102 and the second clutch 104 are disengaged, the first electric motor 14 and the internal combustion engine 12 are separated from each other. The motive power from the first electric motor 14 is transmitted through the odd-numbered position gear. Thus, the regenerative power generation can be performed in a state where the gear is set to an odd-numbered position. Moreover, the vehicle 10 can be driven by the motive power from the first electric motor 14 in the state where the gear is set to the odd-numbered position. The vehicle 10 can start to travel in a state where the gear is set to the first position.

In the dual clutch type transmission 30 as described above, the first clutch 102 and the second clutch 104 in a pre-shift state are connected and disconnected alternately, so that the transmission can be performed quickly. The pre-shift state is a state where the next transmission gear is ready in advance in the first transmission actuator 106 and the second transmission actuator 108.

In the transmission 30 as described above, the motive power is transmitted in the first gear as follows. That is to say, the second clutch 104 is engaged to thereby connect the crank shaft 100 to the main shaft 118. The motive power from the internal combustion engine 12 is transmitted to the crank shaft 100, then transmitted to the first clutch 102, and further transmitted to the main shaft 110. The motive power that has been transmitted to the main shaft 110 is transmitted to the sun gear 98, transmitted to the planetary gears 94, 96, and then transmitted to the main shaft 112. The motive power that has been transmitted to the main shaft 112 is transmitted to the counter shaft 120 through the fifth-position gear pair 172, the third-position gear pair 182, or the seventh-position gear pair 192.

Moreover, in the case of the backward movement, i.e., the reverse, in the transmission 30 as described above, the motive power is transmitted as follows. That is, the first clutch 102 is engaged and the crank shaft 100 and the main shaft 110 are connected with each other. The motive power from the internal combustion engine 12 is transmitted to the crank shaft 100, transmitted to the second clutch 104, and then transmitted to the main shaft 118. The motive power that has been transmitted to the main shaft 118 is transmitted to the idle driving gear 130 and transmitted to the main shaft 110 through the reversing means 245. The motive power that has been transmitted to the main shaft 110 is transmitted to the sun gear 98, transmitted to the planetary gears 94, 96, and then transmitted to the main shaft 112. The motive power that has been transmitted to the main shaft 112 is transmitted to the counter shaft 120 through the fifth-position gear pair 172, the third-position gear pair 182, or the seventh-position gear pair 192.

When the vehicle 10 moves backward, the motive power is transmitted through the reversing means 245. As described above, the reversing means 245 includes a plurality of gears. Thus, the number of gears that are in a meshed state when the vehicle 10 moves backward, among the plurality of gears of the transmission 30, is greater than the number of gears that are in a meshed state when the vehicle 10 moves forward, among the plurality of gears of the transmission 30. That is to say, the number of gears meshed when the vehicle 10 moves backward is greater than the number of gears meshed when the vehicle 10 moves forward. On the other hand, when the vehicle 10 is driven without being based on the operation for an accelerator pedal 70, a user is likely to easily feel a noise, a vibration, or the like since the noise, vibration, or the like does not correspond to feedback based on user's operation. Thus, when the vehicle 10 moves backward by the driving force (first driving force) from the first driving device 34 and the vehicle 10 is driven without being based on the operation for the accelerator pedal 70, the user is likely to feel uncomfortable even if the noise, the vibration, or the like is small. In order to achieve favorable riding comfort, it is preferred that moving the vehicle 10 backward using the first driving device 34 is avoided as much as possible and the vehicle 10 moves backward using only the second driving device 42 to be described below. Note that, as described above, the maximum driving force of the second driving device 42 is smaller than the maximum driving force of the first driving device 34. If it is difficult to drive the vehicle 10 by the driving force from the second driving device 42, it has no choice but to use the driving force from the first driving device 34. In addition, as described later, when an energy storage device 20 needs to be charged, it has no choice but to rotate the internal combustion engine 12 provided in the first driving device 34.

The vehicle 10 further includes the second driving device 42. The second driving device 42 includes the second electric motors (motors) 16, 18. The maximum driving force of the second driving device 42 is smaller than the maximum driving force of the first driving device 34. The second electric motors 16, 18 can be a three-phase AC brushless type motor, for example; however, the second electric motors 16, 18 are not limited thereto. As the second electric motors 16, 18, for example, a three-phase AC brush type motor, a single-phase AC type motor, and a DC type motor may be used.

An output shaft of the second electric motor 16 is connected to a rotation shaft of the left-rear wheel 36a through a clutch 38a and a reducer 40a. An output shaft of the second electric motor 18 is connected to a rotation shaft of the right-rear wheel 36b through a clutch 38b and a reducer 40b. The second driving device 42 can transmit driving force (second driving force) to the second driving wheels 36. In this example, the second driving device 42 is provided on the rear side of the vehicle 10; however, the structure thereof is not limited to this example. The second driving device 42 may be provided on the front side of the vehicle 10. If the second driving device 42 is provided on the front side of the vehicle 10, the second driving device 42 can transmit the driving force to the first driving wheels 32.

The vehicle 10 further includes the energy storage device (high voltage battery, BAT) 20, and inverters (INV) 22, 24, 26. The energy storage device 20 can store the electric power that is supplied from the first electric motor 14, and also can supply the electric power to the first electric motor 14 and the second electric motors 16, 18. For example, the energy storage device 20 includes a plurality of battery cells that are not shown. As the battery cell, for example, a lithium-ion secondary battery, a nickel-hydrogen secondary battery, or the like can be used; however, the battery cell is not limited thereto. As the inverters 22, 24, 26, for example, a three-phase bridge type inverter can be used; however, the inverters 22, 24, 26 are not limited thereto. The inverters 22, 24, 26 can convert the DC power into the three-phase AC power, for example. The inverter 22 can convert DC power supplied from the energy storage device 20 into AC power, and supply the AC power to the first electric motor 14. The inverters 24, 26 can convert DC power supplied from the energy storage device 20 into AC power, and supply the AC power to the second electric motors 16, 18, respectively. The energy storage device 20 can be charged with the regenerative power from the first electric motor 14, for example. Note that a DC/DC converter (not shown) may be provided between the inverters 22, 24, 26 and the energy storage device 20 so that the output voltage of the energy storage device 20, the output voltage of the first electric motor 14, and the like are increased or decreased.

The vehicle 10 further includes an accelerator pedal position sensor 60, a vehicle speed sensor 62, a current sensor 64, a rotation speed sensor 66, and the accelerator pedal 70. The accelerator pedal position sensor 60 detects the opening degree of the accelerator pedal 70, and supplies information in accordance with the opening degree of the accelerator pedal 70 to the vehicle control device 28. The vehicle speed sensor 62 detects the speed of the vehicle 10, i.e., vehicle speed, and supplies information in accordance with the vehicle speed to the vehicle control device 28. The current sensor 64 detects input/output current of the first electric motor 14 and input/output current of the second electric motors 16, 18, and supplies information in accordance with the detected input/output current to the vehicle control device 28. The rotation speed sensor 66 detects the rotation number of the first electric motor 14 per unit time (i.e., the rotation speed) and the rotation number of the second electric motors 16, 18 per unit time, and supplies information in accordance with these rotation speeds to the vehicle control device 28. The accelerator pedal position sensor 60, the vehicle speed sensor 62, the current sensor 64, and the rotation speed sensor 66 constitute a sensor group 67.

The vehicle 10 includes a peripheral environment detection device 65 that detects a peripheral environment of the vehicle 10. The peripheral environment detection device 65 includes an imaging device 68 and an object detection device 69. Note that the peripheral environment detection device 65 may include other devices.

The imaging device 68 obtains images of the periphery of the vehicle 10 so as to capture images around the vehicle 10. Information obtained by the imaging device 68 is supplied to the vehicle control device 28. Although the vehicle 10 includes a plurality of imaging devices 68, one imaging device 68 is illustrated in FIG. 1.

The object detection device 69 detects an object that exists around the vehicle 10. For example, the object detection device 69 outputs light, sonic waves, millimeter waves, or the like to the periphery of the vehicle 10, and receives the light, the sonic waves, the millimeter waves, or the like that is reflected by the object, whereby the object detection device 69 detects the object that exists around the vehicle 10. Information obtained by the object detection device 69 is supplied to the vehicle control device 28. Although the vehicle 10 includes a plurality of object detection device 69, one object detection device is illustrated in FIG. 1.

The vehicle 10 further includes the vehicle control device 28, i.e., a vehicle control ECU (Electronic Control Unit). The vehicle control device 28 can control the first driving device 34, the second driving device 42, and the like on the basis of the information that is supplied to the vehicle control device 28, for example. Note that the vehicle control device 28 may be configured by a combination of a plurality of ECUs.

The vehicle control device 28 includes a calculation unit 52 and a storage unit 54. The calculation unit 52 can be formed by a CPU (Central Processing Unit), an ASIC (Application Specific Integrated Circuit), or the like; however, the calculation unit 52 is not limited thereto. The calculation unit 52 includes a target driving force decision unit 55, a control unit 56, and a determination unit 58. The target driving force decision unit 55, the control unit 56, and the determination unit 58 can be realized by the calculation unit 52 executing programs stored in the storage unit 54. The storage unit 54 includes a volatile memory (not shown) and a non-volatile memory (not shown). Examples of the volatile memory include a RAM. Examples of the non-volatile memory include a ROM and a flash memory. For example, the non-volatile memory stores the programs, tables, maps, and the like.

The target driving force decision unit 55 decides target driving force of the vehicle 10. The target driving force decision unit 55 can decide the target driving force on the basis of the user's operation for the accelerator pedal 70. In addition, the target driving force decision unit 55 can decide the target driving force on the basis of, for example, information from a parking control device 79, which is described below, without being based on the user's operation for the accelerator pedal 70.

The control unit 56 controls at least one of the first driving force which is the driving force of the first driving device 34 and the second driving force which is the driving force of the second driving device 42, on the basis of the target driving force that is decided by the target driving force decision unit 55.

If the determination unit 58 to be described below determines that the amount of electric power stored in the energy storage device 20 has become less than an electric power amount threshold, the control unit 56 can cause the first electric motor 14 to generate electricity by rotating the internal combustion engine 12. The electric power amount threshold may be about 30%, but is not limited thereto.

When the first electric motor 14 generates electricity due to the rotation (operation) of the internal combustion engine 12 and the target driving force decision unit 55 decides the target driving force on the basis of the user's operation for the accelerator pedal 70, the control unit 56 performs first driving control as follows. The first driving control is control in which driving of the vehicle 10 by the first driving force is prioritized. In the first driving control, when both the driving of the vehicle 10 by the first driving force and the driving of the vehicle 10 by the second driving force can be performed, the driving of the vehicle 10 by the first driving force is performed with priority. In the present embodiment, the reason why the first driving control is performed in this case is as follows. When the vehicle 10 is driven on the basis of the operation for the accelerator pedal 70, the noise, the vibration, or the like corresponds to the feedback based on the user's operation. Thus, even if the noise, the vibration, or the like occurs, the user does not feel uncomfortable or strangeness.

In a state where the first electric motor 14 generates electricity due to the rotation of the internal combustion engine 12 and the target driving force decision unit 55 decides the target driving force without being based on the operation for the accelerator pedal 70, the control unit 56 performs second driving control as follows. The second driving control is control in which the driving of the vehicle 10 by the second driving force is prioritized. In the second driving control, when both the driving of the vehicle 10 by the first driving force and the driving of the vehicle 10 by the second driving force can be performed, the driving of the vehicle 10 by the second driving force is performed with priority. The state where the target driving force decision unit 55 decides the target driving force without being based on the operation for the accelerator pedal 70, includes a state where the target driving force decision unit 55 decides the target driving force on the basis of the information from the parking control device 79, for example. In the present embodiment, the reason why the second driving control is performed in this case is as follows. When the vehicle 10 is driven without being based on the operation for the accelerator pedal 70, the noise, the vibration, or the like does not correspond to the feedback based on the user's operation. Thus, the user is likely to easily feel the noise, the vibration, or the like. When the vehicle 10 is driven by only the second driving force, the motive power is transmitted without passing through the transmission 30. Thus, the favorable riding comfort can be achieved.

In a state where the internal combustion engine 12 does not rotate and the vehicle 10 is driven by the second driving force, when the amount of the electric power stored in the energy storage device 20 has become less than the electric power amount threshold, the control unit 56 performs the following process. In this case, the control unit 56 starts to rotate the internal combustion engine 12 to thereby start the electric power generation by the first electric motor 14, and continues driving of the vehicle 10 by the second driving force.

In the state where the vehicle 10 is driven by the second driving force, when the target driving force has become more than or equal to a target driving force threshold, the control unit 56 performs the following control. In addition, in the state where the vehicle 10 is driven by the second driving force, when the target driving force has become more than or equal to the maximum driving force of the second driving device 42, the control unit 56 performs the following control. In this case, the control unit 56 makes a transition from the state where the vehicle 10 is driven by the second driving force to a state where the vehicle 10 is driven by at least the first driving force.

In a state where the internal combustion engine 12 rotates, the vehicle 10 is driven by the first driving force, and the target driving force decision unit 55 decides the target driving force without being based on the operation for the accelerator pedal 70, when the following situation occurs, the control unit 56 performs the following control. In the above state, when the amount of the electric power stored in the energy storage device 20 has changed from a value less than the electric power amount threshold to a value more than or equal to the electric power amount threshold, the control unit 56 continues the rotation of the internal combustion engine 12.

In a state where the internal combustion engine 12 rotates, the vehicle 10 is driven by the second driving force, and the target driving force decision unit 55 decides the target driving force without being based on the operation for the accelerator pedal 70, when the following situation occurs, the control unit 56 performs the following control. In the above state, when the amount of the electric power stored in the energy storage device 20 has changed from a value less than the electric power amount threshold to a value more than or equal to the electric power amount threshold, the control unit 56 stops the rotation of the internal combustion engine 12.

When the speed of the vehicle 10 that moves backward by the first driving force has changed from a value more than or equal to a first speed threshold to a value less than the first speed threshold, the control unit 56 continues the rotation of the internal combustion engine 12 and performs the following control. The control unit 56 makes a transition from the state where the vehicle 10 is driven by the first driving force to the state where the vehicle 10 is driven by the second driving force. Then, the control unit 56 stops the rotation of the internal combustion engine 12 when the speed of the vehicle 10 has become less than a second speed threshold that is smaller than the first speed threshold.

In the state where the vehicle 10 is driven by the second driving force and the target driving force decision unit 55 decides the target driving force without being based on the operation for the accelerator pedal 70, when the following situation occurs, the control unit 56 performs the following control. In the above state, when a skid or slip occurs on the second driving wheels 36, the control unit 56 drives the vehicle 10 by the first driving force and the second driving force.

The determination unit 58 can perform predetermined determination. For example, the determination unit 58 can determine the amount of electric power stored in the energy storage device 20. The energy storage device 20 includes a voltage sensor (not shown), a temperature sensor (not shown), and a current sensor (not shown). These sensors provided on the energy storage device 20 output signals and supply these signals to the vehicle control device 28. The determination unit 58 determines a charging state (SOC: State Of Charge) of the energy storage device 20, that is, the amount of the electric power stored in the energy storage device 20, on the basis of these signals supplied from the energy storage device 20. The determination unit 58 can determine whether the amount of the electric power stored in the energy storage device 20 is less than the electric power amount threshold.

The vehicle 10 further includes a steering device (steering system) 77. The steering device 77 includes a steering ECU (not shown), i.e., an EPS (electric power steering system) ECU, and a steering motor (not shown). The steering ECU controls the direction of the wheels (steered wheels) by controlling the steering motor on the basis of the user's operation for the steering wheel. In addition, the steering ECU controls the direction of the wheels by controlling the steering motor on the basis of a command supplied from the vehicle control device 28. Note that the steering may be performed by changing torque distribution or braking force distribution to the left and right wheels.

The vehicle 10 further includes a braking device (braking force control system) 78. The braking device 78 includes a braking ECU (not shown) and a brake mechanism (not shown). The brake mechanism operates a brake member by a brake motor, a hydraulic mechanism, or the like. The braking ECU controls the brake mechanism on the basis of the user's operation for a brake pedal to thereby control braking force. In addition, the braking ECU controls the brake mechanism on the basis of a command supplied from the vehicle control device 28 to thereby control the braking force.

The vehicle 10 further includes the parking control device (parking control system, parking assistance system, parking assistance unit) 79. The parking control device 79 controls parking of the vehicle 10. Specifically, the parking control device 79 can generate a route (parking route) from an initial position to a target position when the vehicle 10 is parked. The parking control device 79 can generate information to perform the steering and acceleration/deceleration for the vehicle 10 in accordance with the generated route. The operation of the parking control device 79 starts or ends on the basis of an operation input using a touch panel 75 or the like by the user.

The vehicle 10 includes an operation detection unit 71 and an operation input unit 72. The operation detection unit 71 detects contents of the user's operation performed by the operation input unit 72, and outputs the detected operation contents to the vehicle control device 28 or the like. The operation input unit 72 is a shift lever (select lever, selector), for example. The operation detection unit 71 is a shift position sensor, for example. The operation detection unit 71 detects the shift position of the operation input unit 72, and outputs the detected shift position to the vehicle control device 28 or the like. The operation input unit 72 can be used at least when the traveling of the vehicle 10 is changed between the forward traveling and the backward traveling. The operation input unit 72 includes a shift position to cause the vehicle 10 to travel forward, that is, a D (drive) range. Moreover, the operation input unit 72 further includes a shift position to cause the vehicle 10 to travel backward, that is, an R (reverse) range. Furthermore, the operation input unit 72 further includes an N (neutral) range or the like. A P (parking) button that is used when the vehicle is parked or the like may be provided near the operation input unit 72.

The vehicle 10 further includes a communication unit 73. The communication unit 73 can perform wireless communication with an external device that is not shown. Examples of the external device include an external server (not shown). The communication unit 73 may be either detachable or undetachable with respect to the vehicle 10. Examples of the communication unit 73 that is detachable with respect to the vehicle 10 include a mobile phone and a smart phone.

The vehicle 10 includes a navigation device 74. The navigation device 74 detects the current position of the vehicle 10 by using a GPS (Global Positioning System), for example, and shows the user the route to a destination. The navigation device 74 includes a storage device (not shown) including a map information database. The navigation device 74 includes the touch panel 75 and a speaker 76. The touch panel 75 can also function as an input device and a display device of the parking control device 79. The user can input a command regarding the parking control through the touch panel 75. In addition, the touch panel 75 can show a screen regarding the parking control. Note that a component other than the touch panel 75 may be used as the input device or the display device. Moreover, in the parking control, voice guidance can be performed through the speaker 76.

The vehicle 10 includes components other than the above components; however, the description thereof is omitted.

The driving of the vehicle 10 by the first driving wheels 32 is referred to as front wheel drive, that is, FWD (Front Wheel Drive). The driving of the vehicle 10 by the second driving wheels 36 is referred to as rear wheel drive, that is, RWD (Rear Wheel Drive). The driving of the vehicle 10 by the first driving wheels 32 and the second driving wheels 36 is referred to as front and rear wheel drive, that is, AWD (All Wheel Drive). Both the RWD and the FWD are two wheel drive (2WD). The AWD is four wheel drive (4WD). The vehicle control device 28 can switch the driving of the vehicle 10 to the front wheel drive, the rear wheel drive, and the front and rear wheel drive, as appropriate. The vehicle control device 28 uses the internal combustion engine 12, the first electric motor 14, and the second electric motors 16, 18 as appropriate, to thereby drive the vehicle 10. The vehicle control device 28 rotates the first electric motor 14 by the rotation of the internal combustion engine 12 to thereby perform the electric power generation by the first electric motor 14. The electric power obtained from the electric power generation by the first electric motor 14 can be supplied to the second electric motors 16, 18. Moreover, the electric power obtained from the electric power generation by the first electric motor 14 can be supplied to an auxiliary device (not shown) and the like. Furthermore, the electric power obtained from the electric power generation by the first electric motor 14 can be stored in the energy storage device 20. As described above, the first electric motor 14 can also be used as a power generator.

Figure 24:
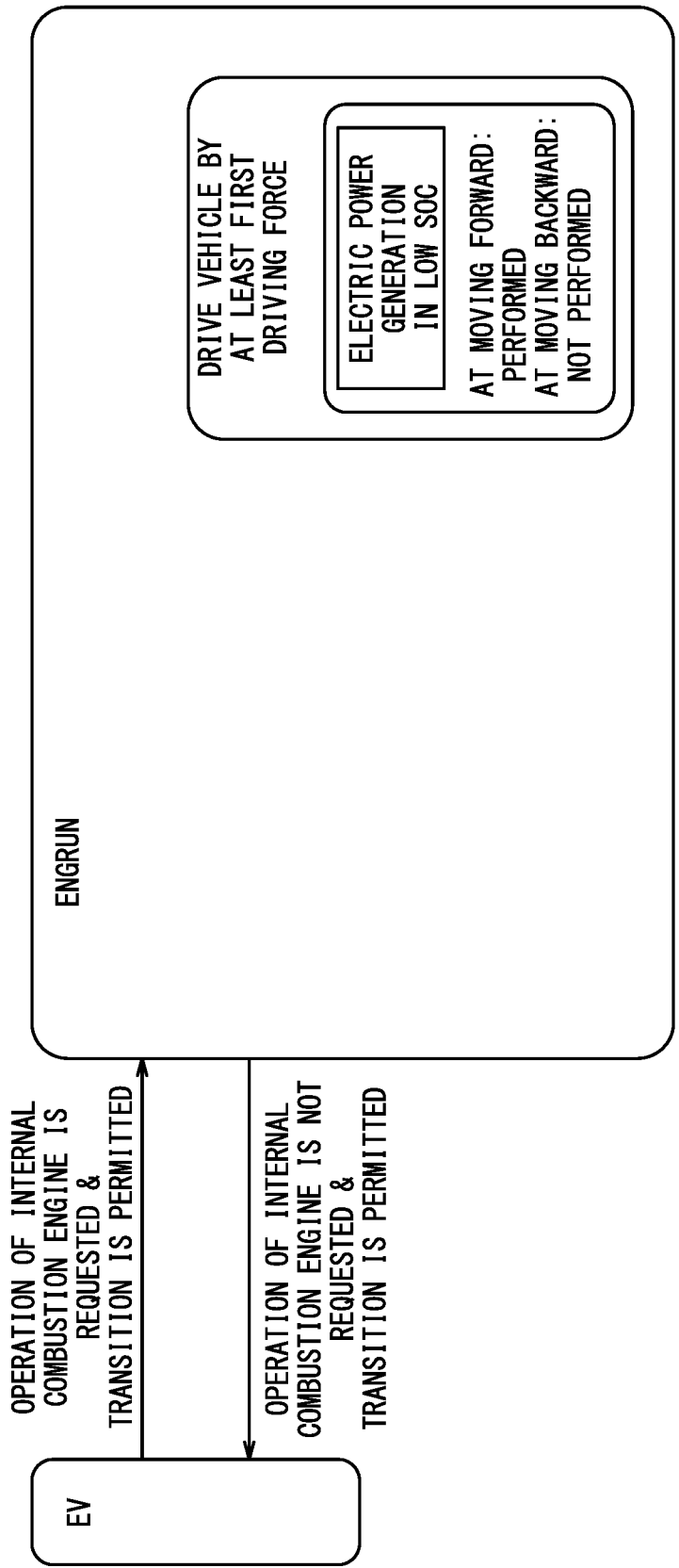
FIG. 24 is a state transition diagram illustrating one example of the operation of the vehicle control device according to the first embodiment.
Figure 25:
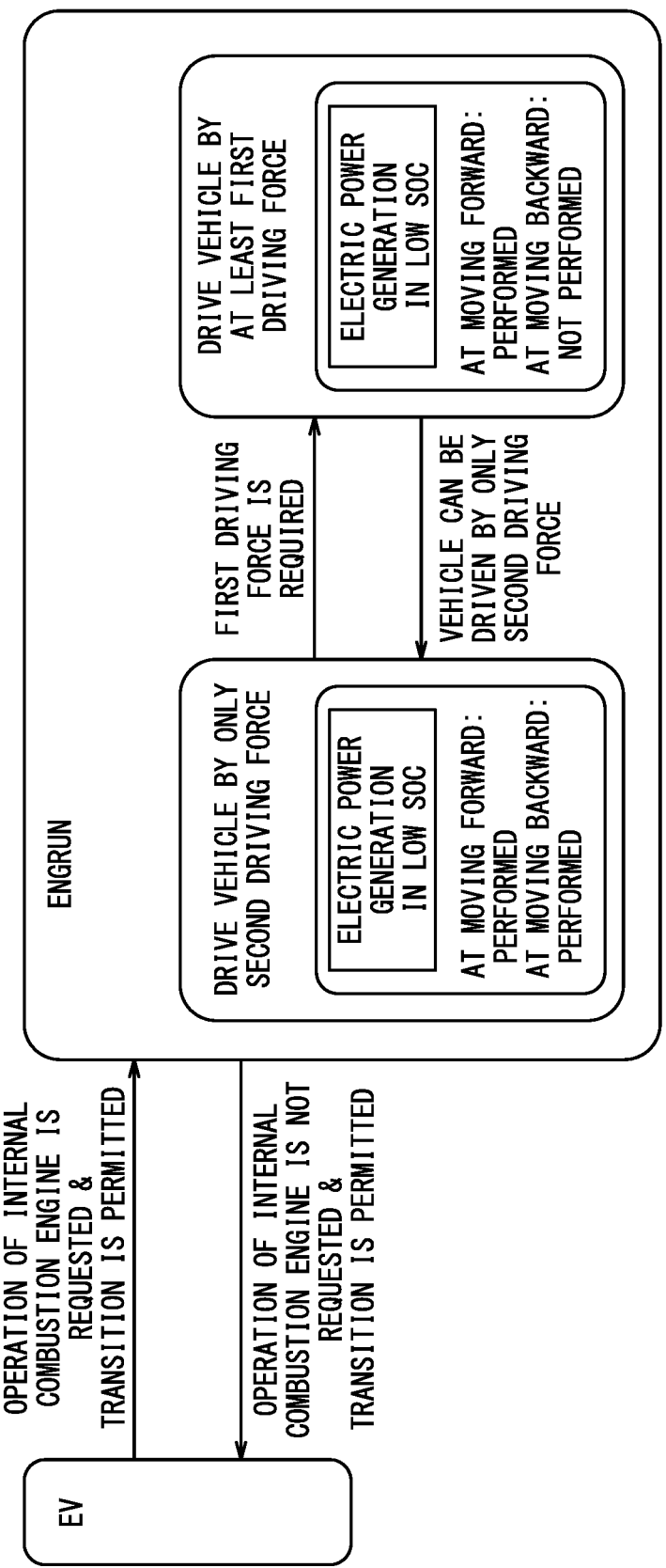
FIG. 25 is a state transition diagram illustrating one example of the operation of the vehicle control device according to the first embodiment.

FIGS. 24 and 25 are state transition diagrams illustrating examples of operation of the vehicle control device according to the present embodiment. FIG. 24 is a state transition diagram in a case that the target driving force is decided on the basis of the user's operation for the accelerator pedal 70, that is, a state transition diagram in normal traveling. FIG. 25 is a state transition diagram in a case that the target driving force is decided on the basis of the information from the parking control device 79, for example, without being based on the user's operation for the accelerator pedal 70, that is, a state transition diagram in automated parking driving. The term "EV" in FIGS. 24 and 25 means a state where the vehicle is driven by the second electric motors 16, 18 without rotating the internal combustion engine 12, that is, an EV state. The term "ENGRUN" in FIGS. 24 and 25 means a state where the internal combustion engine 12 is rotated, that is an ENGRUN (ENGINE RUN) state.

If there is a request to operate the internal combustion engine 12 and a transition between the EV state and the ENGRUN state is permitted, a transition from the EV state to the ENGRUN state is performed. On the other hand, if there is no request to operate the internal combustion engine 12 and the transition between the EV state and the ENGRUN state is permitted, a transition from the ENGRUN state to the EV state is performed.

As shown in FIG. 25, when the vehicle 10 is in the automated parking driving and the internal combustion engine 12 is rotated, the vehicle 10 may be driven by at least the first driving force or the vehicle 10 may be driven by only the second driving force. When the vehicle 10 is in the automated parking driving, the internal combustion engine 12 is rotated, and the first driving force is required, the state is set to a state where the vehicle 10 is driven by at least the first driving force. When the vehicle 10 is in the automated parking, the internal combustion engine 12 is rotated, and the vehicle 10 can be driven by only the second driving force, the state is set to a state where the vehicle 10 is driven by only the second driving force. In the state where the vehicle 10 is driven by only the second driving force, if the first driving force becomes necessary, the state is changed to a state where the vehicle 10 is driven by at least the first driving force. In the state where the vehicle 10 is driven by at least the first driving force, if it becomes possible to drive the vehicle 10 by only the second driving force, the state is changed to a state where the vehicle 10 is driven by only the second driving force. Note that in a state where the vehicle 10 is driven by only the first driving force, if the requested driving force becomes large or the four wheel drive is requested, the vehicle 10 is driven by both the first driving force and the second driving force.

As described above, when the vehicle 10 is in the automated parking driving and the internal combustion engine 12 is rotated, the vehicle 10 may be driven by at least the first driving force or the vehicle 10 may be driven by only the second driving force. On the other hand, the vehicle 10 is in the normal driving and the internal combustion engine 12 is rotated, the vehicle 10 is driven by at least the first driving force and the vehicle 10 is not driven by only the second driving force, as illustrated in FIG. 24.

In the state where the internal combustion engine 12 is rotated and the vehicle 10 is driven by at least the first driving force, when the amount of the electric power stored in the energy storage device 20 has become less than the electric power amount threshold (in low SOC), the following process is performed. In both the normal driving and the automated parking driving, when the vehicle 10 moves forward, the first electric motor 14 generates electricity by rotating the internal combustion engine 12, as shown in FIGS. 24 and 25. In both the normal driving and the automated parking driving, when the vehicle 10 moves backward, the electric power generation is not performed as illustrated in FIGS. 24 and 25.

In the state where the internal combustion engine 12 is rotated and the vehicle 10 is driven by only the second driving force, if the amount of the electric power stored in the energy storage device 20 has become less than the electric power amount threshold (in low SOC) during the automated parking driving, the following process is performed. As shown in FIG. 25, in both cases where the vehicle 10 moves forward and where the vehicle 10 moves backward, the first electric motor 14 generates electricity by rotating the internal combustion engine 12.

Figure 3:
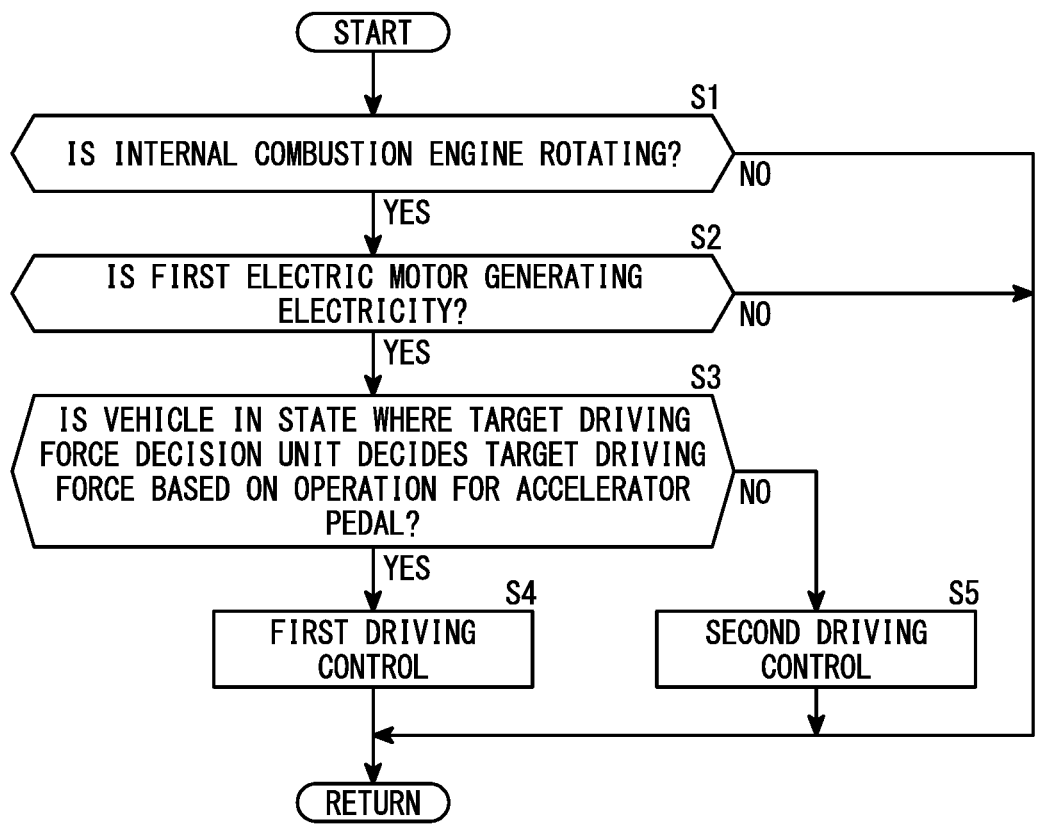
FIG. 3 is a flowchart showing one example of the operation of a vehicle control device according to the first embodiment.

FIG. 3 is a flowchart showing an example of operation of the vehicle control device according to the present embodiment.

In step S1, the control unit 56 determines whether the internal combustion engine 12 is rotating, i.e., whether the internal combustion engine 12 is in operation. If the internal combustion engine 12 is rotating (step S1: YES), the process goes to step S2. If the internal combustion engine 12 is not rotated (step S1: NO), the process in FIG. 3 ends.

In step S2, the control unit 56 determines whether the first electric motor 14 is generating electricity by rotating the internal combustion engine 12. If the first electric motor 14 is generating electricity (step S2: YES), the process advances to step S3. If the first electric motor 14 is not generating electricity (step S2: NO), the process in FIG. 3 ends.

In step S3, the control unit 56 determines whether the vehicle 10 is in a state where the target driving force decision unit 55 decides the target driving force on the basis of the user's operation for the accelerator pedal 70 or not. If the vehicle 10 is in the state where the target driving force decision unit 55 decides the target driving force on the basis of the user's operation for the accelerator pedal 70 (step S3: YES), the process advances to step S4. If the vehicle 10 is in the state where the target driving force decision unit 55 decides the target driving force without being based on the user's operation for the accelerator pedal 70 (step S3: NO), the process advances to step S5.

In step S4, the control unit 56 performs the first driving control. In the first driving control, driving of the vehicle 10 by the first driving force is prioritized.

In step S5, the control unit 56 performs the second driving control. In the second driving control, driving of the vehicle 10 by the second driving force is prioritized. As described above, the process in FIG. 3 ends.

Figure 4:
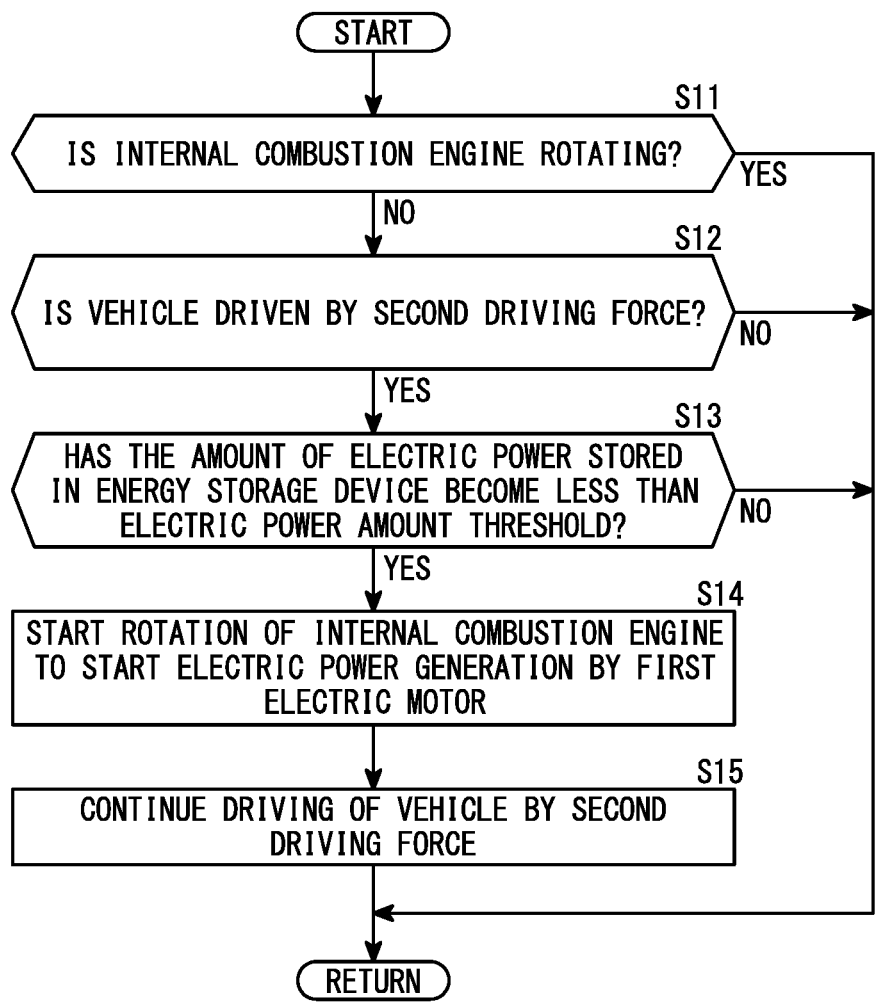
FIG. 4 is a flowchart showing one example of the operation of the vehicle control device according to the first embodiment.

FIG. 4 is a flowchart showing one example of the operation of the vehicle control device according to the present embodiment.

In step S11, the control unit 56 determines whether the internal combustion engine 12 is rotating. If the internal combustion engine 12 is rotating (step S11: YES), the process in FIG. 4 ends. If the internal combustion engine 12 is not rotated (step S11: NO), the process goes to step S12.

In step S12, the control unit 56 determines whether the vehicle 10 is driven by the second driving force. If the vehicle 10 is driven by the second driving force (step S12: YES), the process advances to step S13. If the vehicle 10 is not driven by the second driving force (step S12: NO), the process in FIG. 4 ends.

In step S13, the control unit 56 determines whether the amount of the electric power stored in the energy storage device 20 has become less than the electric power amount threshold. If the amount of the electric power stored in the energy storage device 20 has become less than the electric power amount threshold (step S13: YES), the process advances to step S14. If the amount of the electric power stored in the energy storage device 20 is more than or equal to the electric power amount threshold (step S13: NO), the process in FIG. 4 ends.

In step S14, the control unit 56 starts the rotation of the internal combustion engine 12 to thereby start the electric power generation by the first electric motor 14. After that, the process advances to step S15.

In step S15, the control unit 56 continues driving of the vehicle 10 by the second driving force. As described above, the process in FIG. 4 ends.

Figure 5:
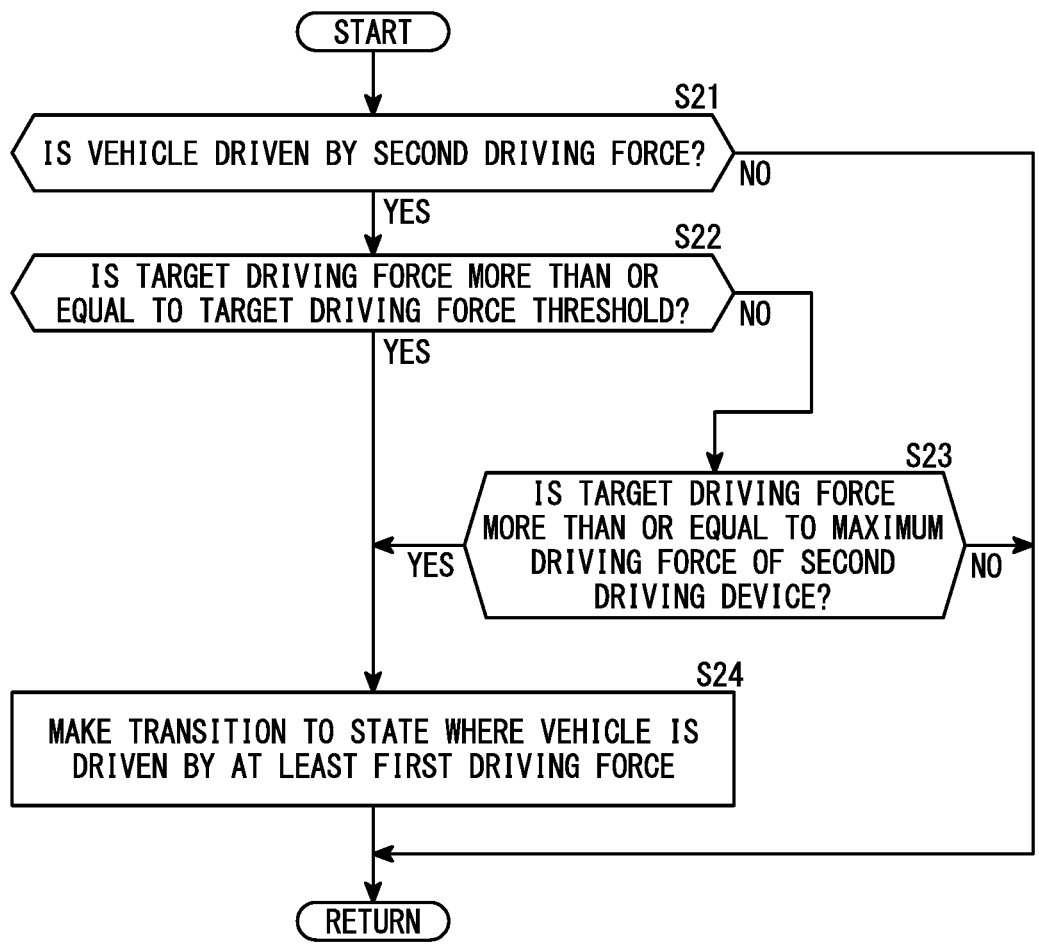
FIG. 5 is a flowchart showing one example of the operation of the vehicle control device according to the first embodiment.

FIG. 5 is a flowchart showing one example of the operation of the vehicle control device according to the present embodiment.

In step S21, the control unit 56 determines whether the vehicle 10 is driven by the second driving force. If the vehicle 10 is driven by the second driving force (step S21: YES), the process advances to step S22. If the vehicle 10 is not driven by the second driving force (step S21: NO), the process in FIG. 5 ends.

In step S22, the control unit 56 determines whether the target driving force is more than or equal to the target driving force threshold or not (i.e., whether the target driving force the target driving force threshold). If the target driving force is more than or equal to the target driving force threshold (step S22: YES), the process advances to step S24. If the target driving force is less than the target driving force threshold (step S22: NO), the process advances to step S23.

In step S23, the control unit 56 determines whether the target driving force is more than or equal to the maximum driving force of the second driving device 42 or not (i.e., whether the target driving force the maximum driving force). If the target driving force is more than or equal to the maximum driving force of the second driving device 42 (step S23: YES), the process advances to step S24. If the target driving force is less than the maximum driving force of the second driving device 42 (step S23: NO), the process in FIG. 5 ends.

In step S24, the control unit 56 makes a transition to the state where the vehicle 10 is driven by at least the first driving force. Then, the process in FIG. 5 ends.

Figure 6:
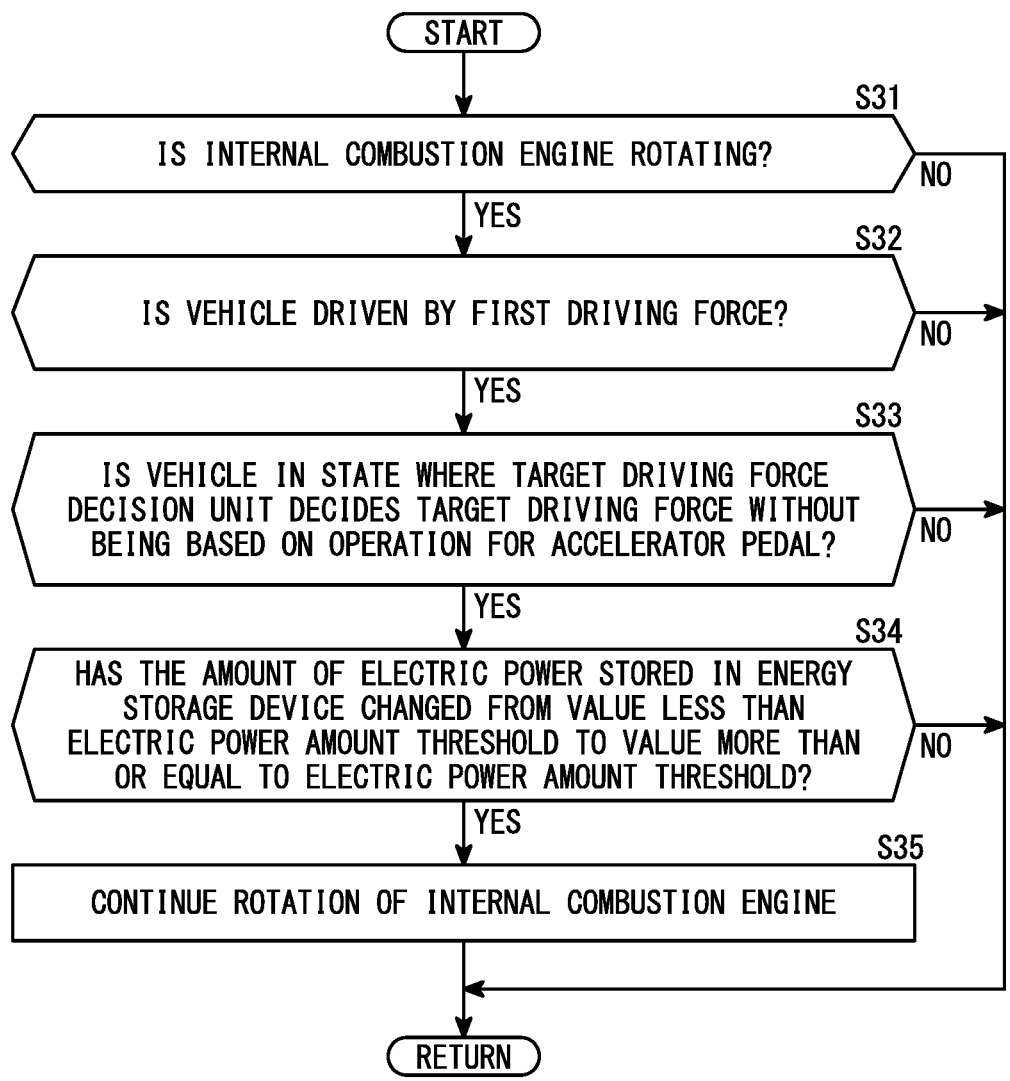
FIG. 6 is a flowchart showing one example of the operation of the vehicle control device according to the first embodiment.

FIG. 6 is a flowchart showing one example of the operation of the vehicle control device according to the present embodiment.

In step S31, the control unit 56 determines whether the internal combustion engine 12 is rotating. If the internal combustion engine 12 is rotating (step S31: YES), the process advances to step S32. If the internal combustion engine 12 is not rotated (step S31: NO), the process in FIG. 6 ends.

In step S32, the control unit 56 determines whether the vehicle 10 is driven by the first driving force. If the vehicle 10 is driven by the first driving force (step S32: YES), the process advances to step S33. If the vehicle 10 is not driven by the first driving force (step S32: NO), the process in FIG. 6 ends.

In step S33, the control unit 56 determines whether the vehicle 10 is in the state where the target driving force decision unit 55 decides the target driving force without being based on the operation for the accelerator pedal 70 or not. If the vehicle 10 is in the state where the target driving force decision unit 55 decides the target driving force without being based on the operation for the accelerator pedal 70 (step S33: YES), the process advances to step S34. If the vehicle 10 is in the state where the target driving force decision unit 55 decides the target driving force based on the operation for the accelerator pedal 70 (step S33: NO), the process in FIG. 6 ends.

In step S34, the control unit 56 determines whether the amount of the electric power stored in the energy storage device 20 has changed from a value less than the electric power amount threshold to a value more than or equal to the electric power amount threshold. If the amount of the electric power stored in the energy storage device 20 has changed from a value less than the electric power amount threshold to a value more than or equal to the electric power amount threshold (step S34: YES), the process advances to step S35. If the amount of the electric power stored in the energy storage device 20 has not changed from a value less than the electric power amount threshold to a value more than or equal to the electric power amount threshold (step S34: NO), the process in FIG. 6 ends.

In step S35, the control unit 56 continues the rotation of the internal combustion engine 12. Then, the process in FIG. 6 ends.

Figure 7:
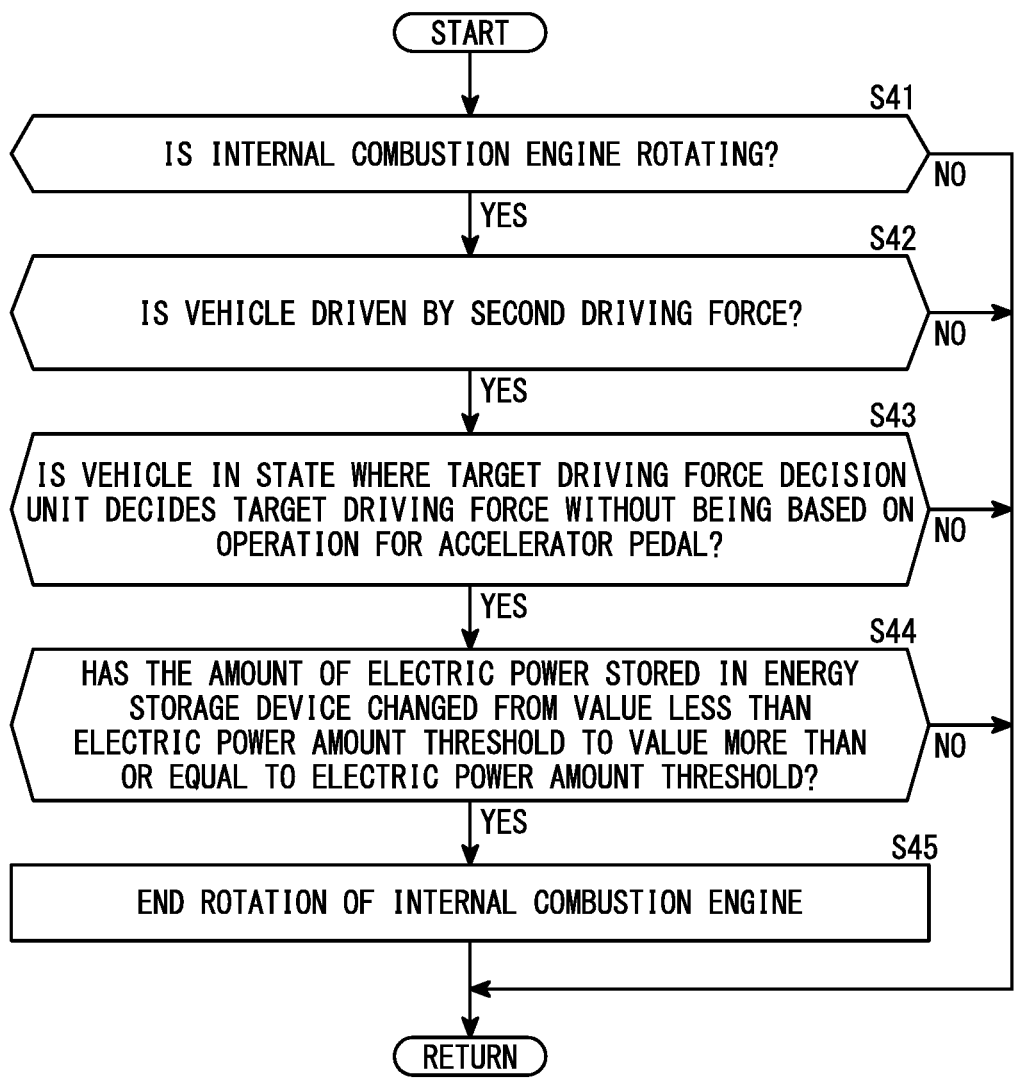
FIG. 7 is a flowchart showing one example of the operation of the vehicle control device according to the first embodiment.

FIG. 7 is a flowchart showing one example of the operation of the vehicle control device according to the present embodiment.

In step S41, the control unit 56 determines whether the internal combustion engine 12 is rotating. If the internal combustion engine 12 is rotating (step S41: YES), the process advances to step S42. If the internal combustion engine 12 is not rotated (step S41: NO), the process in FIG. 7 ends.

In step S42, the control unit 56 determines whether the vehicle 10 is driven by the second driving force. If the vehicle 10 is driven by the second driving force (step S42: YES), the process advances to step S43. If the vehicle 10 is not driven by the second driving force (step S42: NO), the process in FIG. 7 ends.

In step S43, the control unit 56 determines whether the vehicle 10 is in the state where the target driving force decision unit 55 decides the target driving force without being based on the operation for the accelerator pedal 70. If the vehicle 10 is in the state where the target driving force decision unit 55 decides the target driving force without being based on the operation for the accelerator pedal 70 (step S43: YES), the process advances to step S44. If the vehicle 10 is in the state where the target driving force decision unit 55 decides the target driving force based on the operation for the accelerator pedal 70 (step S43: NO), the process in FIG. 7 ends.

In step S44, the control unit 56 determines whether the amount of the electric power stored in an energy storage device 44 has changed from a value less than the electric power amount threshold to a value more than or equal to the electric power amount threshold. If the amount of the electric power stored in the energy storage device 44 has changed from a value less than the electric power amount threshold to a value more than or equal to the electric power amount threshold (step S44: YES), the process advances to step S45. If the amount of the electric power stored in the energy storage device 44 has not changed from a value less than the electric power amount threshold to a value more than or equal to the electric power amount threshold (step S44: NO), the process in FIG. 7 ends.

In step S45, the control unit 56 ends the rotation of the internal combustion engine 12. Then, the process in FIG. 7 ends.

Figure 8:
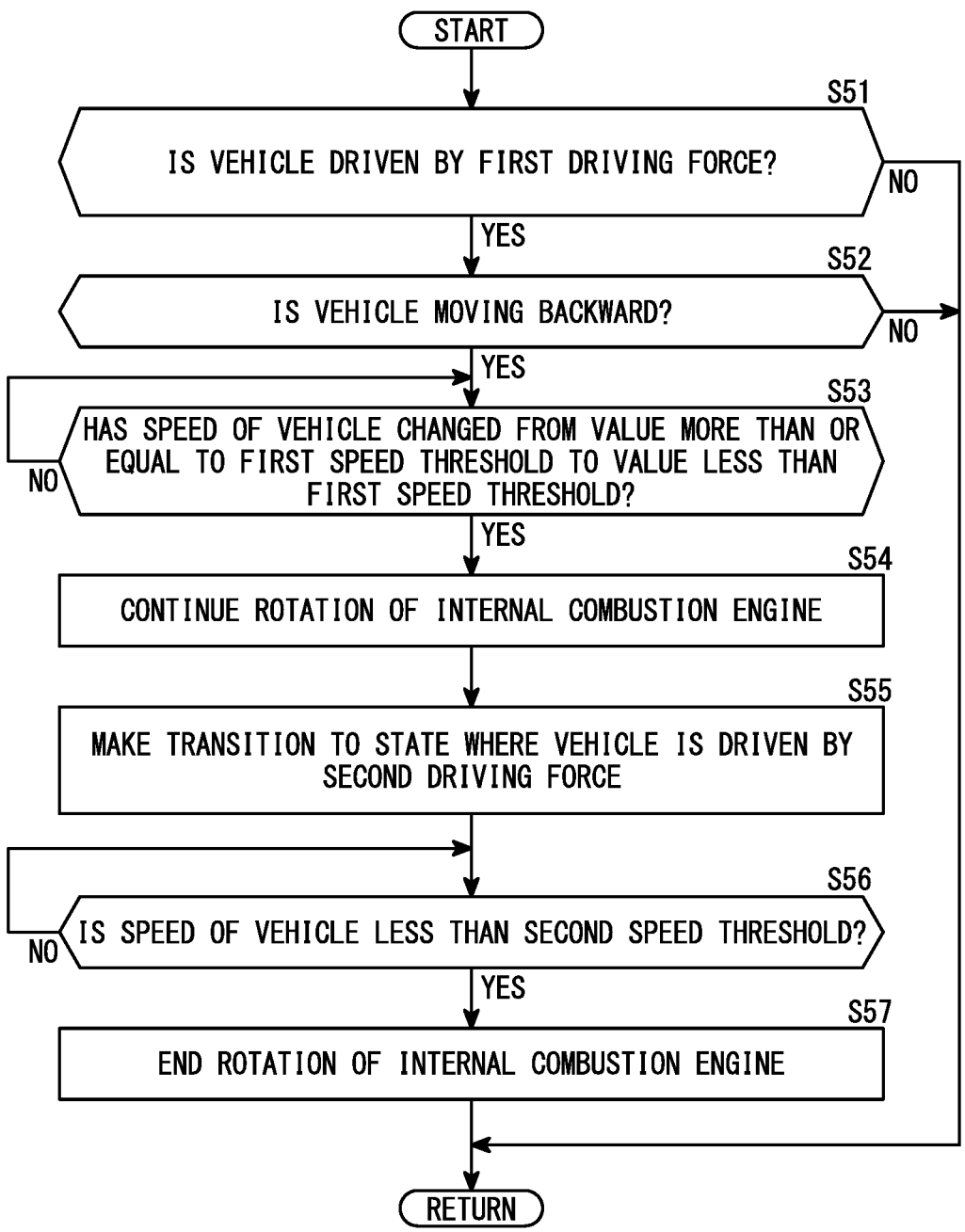
FIG. 8 is a flowchart showing one example of the operation of the vehicle control device according to the first embodiment.

FIG. 8 is a flowchart showing one example of the operation of the vehicle control device according to the present embodiment.

In step S51, the control unit 56 determines whether the vehicle 10 is driven by the first driving force. If the vehicle 10 is driven by the first driving force (step S51: YES), the process advances to step S52. If the vehicle 10 is not driven by the first driving force (step S51: NO), the process in FIG. 8 ends.

In step S52, the control unit 56 determines whether the vehicle 10 is moving backward. If the vehicle 10 is moving backward (step S52: YES), the process advances to step S53. If the vehicle 10 is not moving backward (step S52: NO), the process in FIG. 8 ends.

In step S53, the control unit 56 determines whether the speed of the vehicle 10 has changed from a value more than or equal to the first speed threshold to a value less than the first speed threshold. If the speed of the vehicle 10 has changed from a value more than or equal to the first speed threshold to a value less than the first speed threshold (step S53: YES), the process advances to step S54. If the speed of the vehicle 10 is more than or equal to the first speed threshold (step S53: NO), the process in step S53 is repeated. Note that in step S53, the control unit 56 may determine whether the vehicle 10 has been stopped.

In step S54, the control unit 56 continues the rotation of the internal combustion engine 12. After that, the process advances to step S55.

In step S55, the control unit 56 makes a transition to the state where the vehicle 10 is driven by the second driving force. After that, the process goes to step S56.

In step S56, the control unit 56 determines whether the speed of the vehicle 10 is less than the second speed threshold. As described above, the second speed threshold is smaller than the first speed threshold. If the speed of the vehicle 10 is less than the second speed threshold (step S56: YES), the process goes to step S57. If the speed of the vehicle 10 is more than or equal to the second speed threshold (step S56: NO), the process in step S56 is repeated.

In step S57, the control unit 56 ends the rotation of the internal combustion engine 12. Then, the process in FIG. 8 ends.

Figure 9:
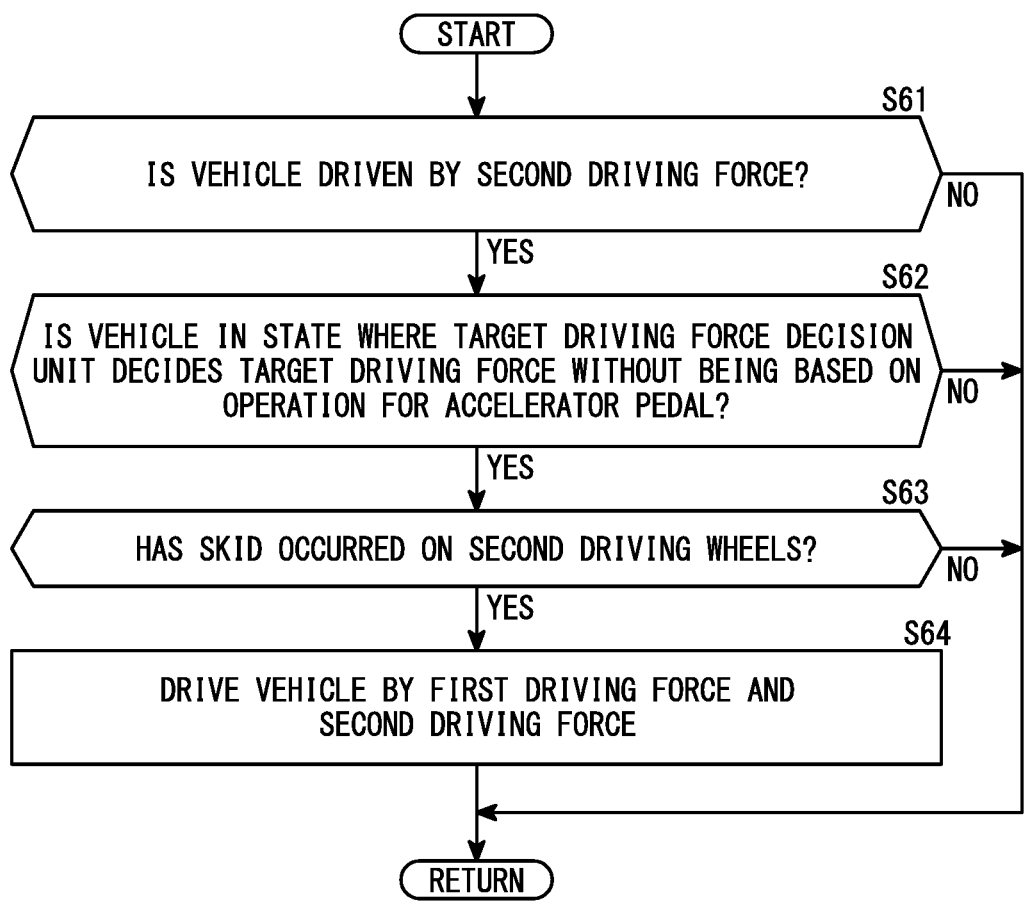
FIG. 9 is a flowchart showing one example of the operation of the vehicle control device according to the first embodiment.

FIG. 9 is a flowchart showing one example of the operation of the vehicle control device according to the present embodiment.

In step S61, the control unit 56 determines whether the vehicle 10 is driven by the second driving force. If the vehicle 10 is driven by the second driving force (step S61: YES), the process advances to step S62. If the vehicle 10 is not driven by the second driving force (step S61: NO), the process in FIG. 9 ends.

In step S62, the control unit 56 determines whether the vehicle 10 is in the state where the target driving force decision unit 55 decides the target driving force without being based on the operation for the accelerator pedal 70. If the vehicle 10 is in the state where the target driving force decision unit 55 decides the target driving force without being based on the operation for the accelerator pedal 70 (step S62: YES), the process advances to step S63. If the vehicle 10 is not in the state where the target driving force decision unit 55 decides the target driving force without being based on the operation for the accelerator pedal 70 (step S62: NO), the process in FIG. 9 ends.

In step S63, the control unit 56 determines whether a skid (slip) has occurred on the second driving wheels 36. If a skid has occurred on the second driving wheels 36 (step S63: YES), the process advances to step S64. If no skid has occurred on the second driving wheels 36 (step S63: NO), the process in FIG. 9 ends.

In step S64, the control unit 56 drives the vehicle 10 by the first driving force and the second driving force. Then, the process in FIG. 9 ends.

Figure 10:
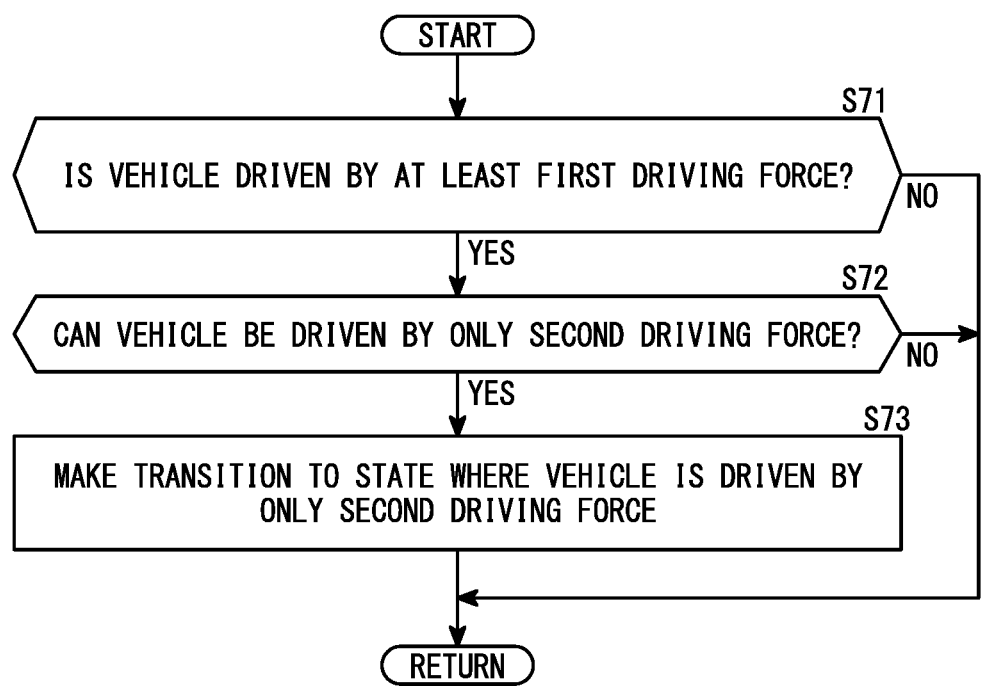
FIG. 10 is a flowchart showing one example of the operation of the vehicle control device according to the first embodiment.

FIG. 10 is a flowchart showing one example of the operation of the vehicle control device according to the present embodiment.

In step S71, the control unit 56 determines whether the vehicle 10 is driven by at least the first driving force. If the vehicle 10 is driven by at least the first driving force (step S71: YES), the process advances to step S72. If the vehicle 10 is not driven by at least the first driving force (step S71: NO), the process in FIG. 10 ends.

In step S72, the control unit 56 determines whether the vehicle 10 can be driven by only the second driving force. If the vehicle 10 can be driven by only the second driving force (step S72: YES), the process advances to step S73. If the vehicle 10 cannot be driven by only the second driving force (step S72: NO), the process in FIG. 10 ends.

In step S73, the control unit 56 makes a transition to the state where the vehicle 10 is driven by only the second driving force. Then, the process in FIG. 10 ends.

Figure 11:
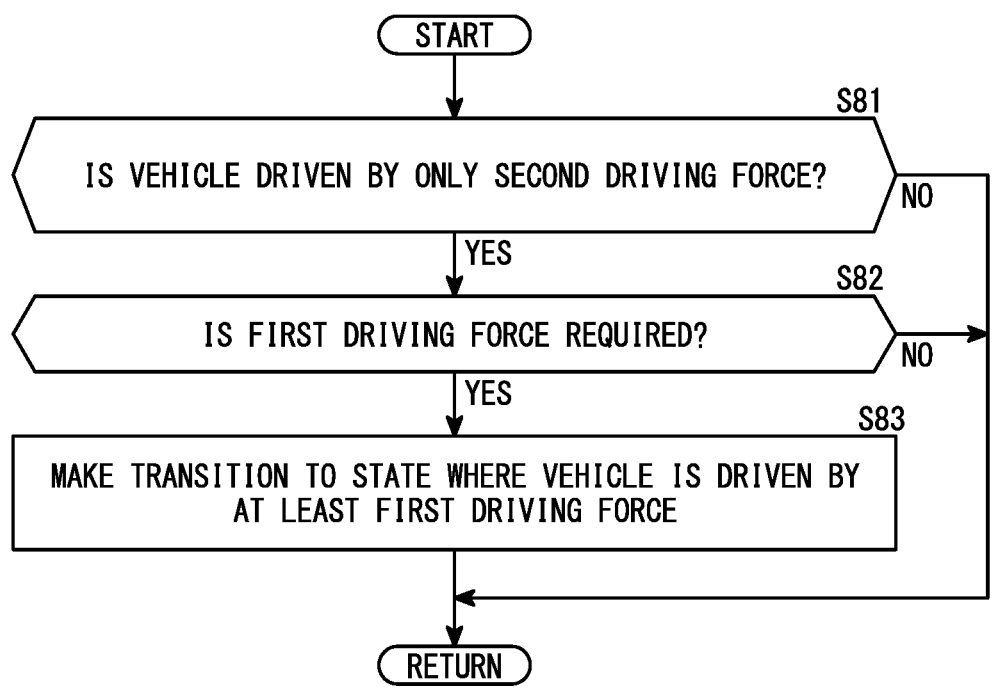
FIG. 11 is a flowchart showing one example of the operation of the vehicle control device according to the first embodiment.

FIG. 11 is a flowchart showing one example of the operation of the vehicle control device according to the present embodiment.

In step S81, the control unit 56 determines whether the vehicle 10 is driven by only the second driving force. If the vehicle 10 is driven by only the second driving force (step S81: YES), the process advances to step S82. If the vehicle 10 is not driven by only the second driving force (step S81: NO), the process in FIG. 11 ends.

In step S82, the control unit 56 determines whether the first driving force is required. If the first driving force is required (step S82: YES), the process advances to step S83. If the first driving force is not required (step S82: NO), the process shown in FIG. 11 ends.

In step S83, the control unit 56 makes a transition to the state where the vehicle 10 is driven by at least the first driving force. Then, the process shown in FIG. 11 ends.

Figure 12:
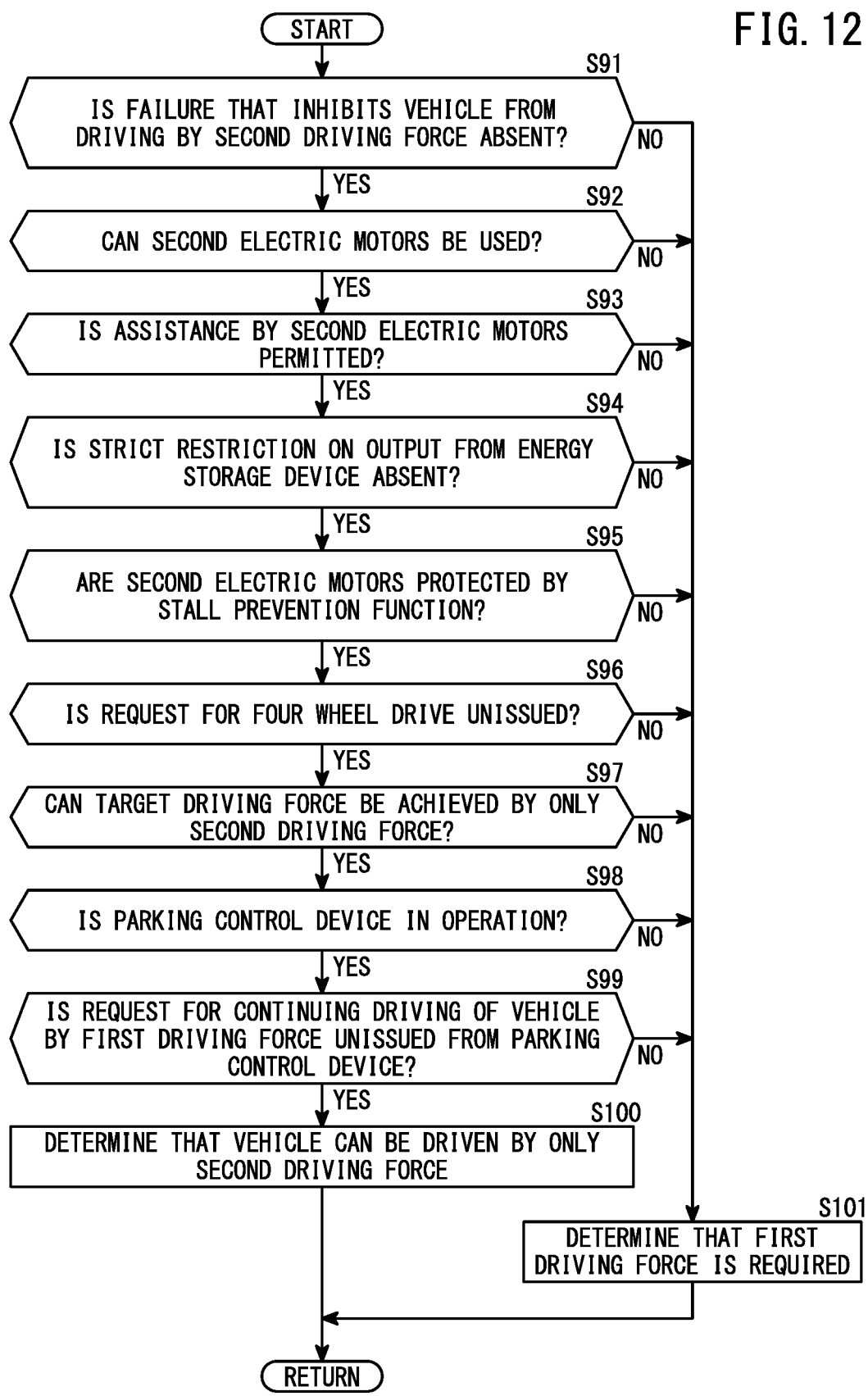
FIG. 12 is a flowchart showing one example of the operation of the vehicle control device according to the first embodiment.

FIG. 12 is a flowchart showing one example of the operation of the vehicle control device according to the present embodiment. The process shown in FIG. 12 can be performed in step S72 in FIG. 10. In addition, the process in FIG. 12 can be performed in step S82 in FIG. 11.

In step S91, the control unit 56 determines whether a failure that inhibits the vehicle 10 from driving by the second driving force is absent. If the failure that inhibits the vehicle 10 from driving by the second driving force is absent (step S91: YES), the process advances to step S92. If the failure that inhibits the vehicle 10 from driving by the second driving force is present (step S91: NO), the process advances to step S101.

In step S92, the control unit 56 determines whether the second electric motors 16, 18 can be used. If the second electric motors 16, 18 can be used (step S92: YES), the process advances to step S93. If the second electric motors 16, 18 cannot be used (step S92: NO), the process advances to step S101.

In step S93, the control unit 56 determines whether assistance by the second electric motors 16, 18 is permitted. If the assistance by the second electric motors 16, 18 is permitted (step S93: YES), the process advances to step S94. If the assistance by the second electric motors 16, 18 is not permitted (step S93: NO), the process advances to step S101.

In step S94, the control unit 56 determines whether a strict restriction on the output from the energy storage device 20 is absent or not. If a strict restriction on the output from the energy storage device 20 is absent (step S94: YES), the process advances to step S95. If a strict restriction on the output of the energy storage device 20 is present (step S94: NO), the process advances to step S101.

In step S95, the control unit 56 determines whether the second electric motors 16, 18 are protected by a stall prevention function. If the second electric motors 16, 18 are protected by the stall prevention function (step S95: YES), the process advances to step S96. If the second electric motors 16, 18 are not protected by the stall prevention function (step S95: NO), the process advances to step S101.

In step S96, the control unit 56 determines whether the request for the four wheel drive is unissued. If the request for the four wheel drive is unissued (step S96: YES), the process advances to step S97. If the request for the four wheel drive is issued (step S96: NO), the process advances to step S101.

In step S97, the control unit 56 determines whether the target driving force can be achieved by only the second driving force. If the target driving force can be achieved by only the second driving force (step S97: YES), the process advances to step S98. If the target driving force cannot be achieved by only the second driving force (step S97: NO), the process advances to step S101.

In step S98, the control unit 56 determines whether the parking control device 79 is in operation. If the parking control device 79 is in operation (step S98: YES), the process advances to step S99. If the parking control device 79 is not in operation (step S98: NO), the process advances to step S101.

In step S99, the control unit 56 determines whether the request for continuing driving of the vehicle 10 by the first driving force is unissued from the parking control device 79. If the request for continuing driving of the vehicle 10 by the first driving force is unissued from the parking control device 79 (step S99: YES), the process advances to step S100. If the request for continuing driving of the vehicle 10 by the first driving force is issued from the parking control device 79 (step S99: NO), the process advances to step S101.

In step S100, the control unit 56 determines that the vehicle 10 can be driven by only the second driving force.

In other words, the control unit 56 determines that the first driving force is not required.

In step S101, the control unit 56 determines that the first driving force is required. In other words, the control unit 56 determines that the vehicle 10 cannot be driven by only the second driving force.

Figure 13:
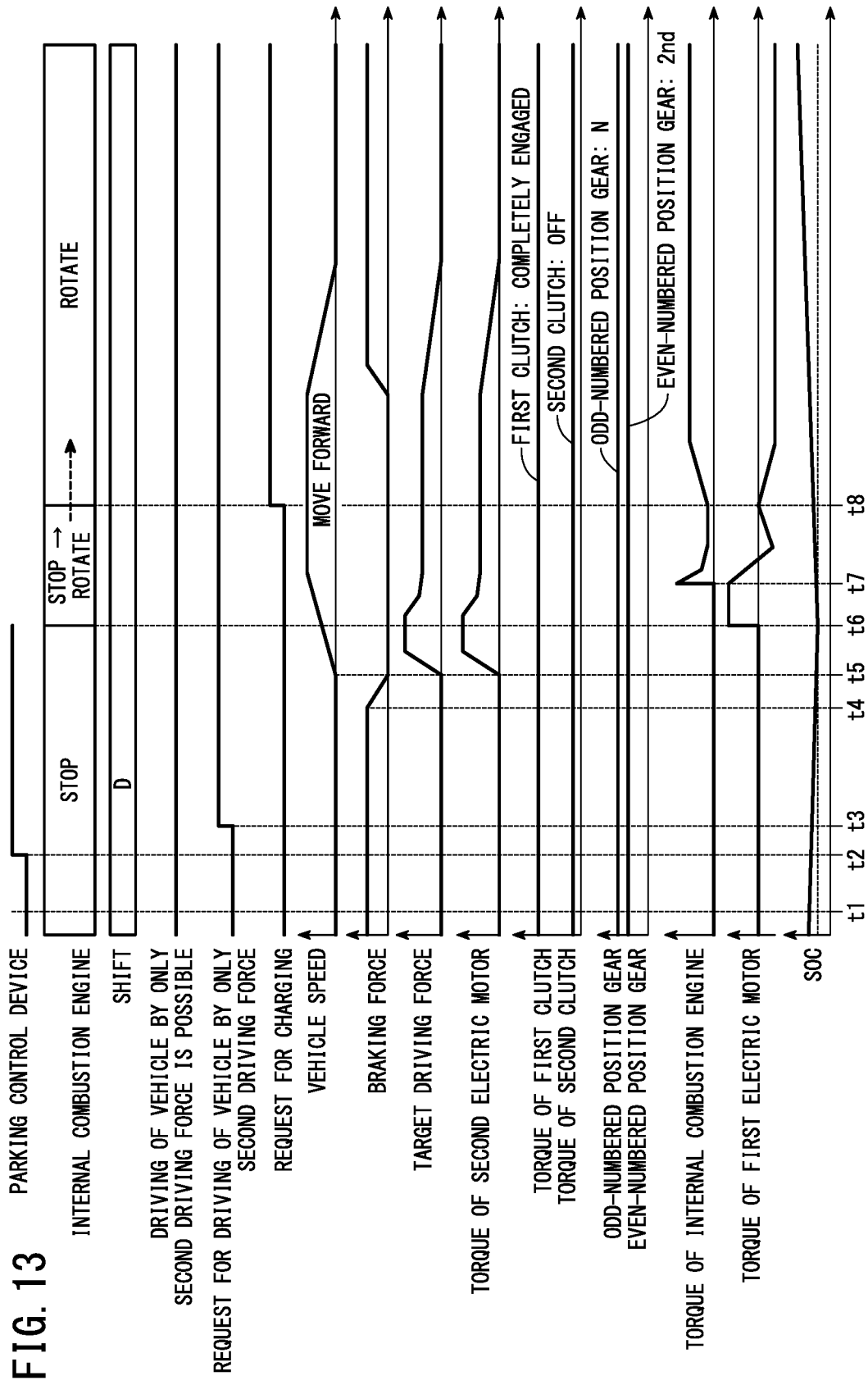
FIG. 13 is a time chart showing one example of the operation of the vehicle control device according to the first embodiment.

FIG. 13 is a time chart showing one example of operation of the vehicle control device according to the present embodiment. The time chart in FIG. 13 corresponds to the operation that is described above with reference to FIG. 4.

A situation at a timing t1 is as follows. The parking control device 79 is not in operation. The internal combustion engine 12 is not rotated. That is to say, the internal combustion engine 12 is stopped. The shift is set to the D (drive). The determination unit 58 has determined that the vehicle 10 can be driven by only the second driving force. The driving of the vehicle 10 by only the second driving force is not requested. The charging is not requested, that is, a request for charging the energy storage device 20 is not issued. The vehicle speed is zero. The braking force is applied. The target driving force is zero. The torque of the second electric motors 16, 18 is zero. The first clutch 102 is engaged completely. The second clutch 104 is not engaged. The odd-numbered position gear is set to the N (neutral). The even-numbered position gear is set to the second. The torque of the internal combustion engine 12 is zero. The torque of the first electric motor 14 is zero. The amount of the electric power stored in the energy storage device 20, i.e., the SOC, is more than or equal to the electric power amount threshold.

At a timing t2, the parking control device 79 starts to operate.

At a timing t3, the driving of the vehicle 10 by only the second driving force is requested.

At a timing t4, the braking force is decreased.

At a timing t5, the target driving force decided by the target driving force decision unit 55 increases, and in accordance with this, the torque of the second electric motors 16, 18 increases. As a result, the speed of the vehicle 10 increases. Thus, the vehicle 10 is driven by the second electric motors 16, 18.

At a timing t6, the amount of the electric power stored in the energy storage device 20, i.e., the SOC, becomes less than the electric power amount threshold. When the amount of the electric power stored in the energy storage device 20 has become less than the electric power amount threshold, the vehicle control device 28 increases the torque of the first electric motor 14 in order to start the internal combustion engine 12.

As at timing t7, the internal combustion engine 12 starts to rotate.

At a timing t8, the request for charging is issued. Since the first electric motor 14 generates electricity, the amount of electric power stored in the energy storage device 20, i.e., the SOC, increases. After the timing t8 also, the vehicle 10 is driven by the second electric motors 16, 18.

When the vehicle 10 is driven without being based on the operation for the accelerator pedal 70, if the noise, the vibration, or the like occurs, the user feels uncomfortable. However, in the present embodiment, when the vehicle 10 is driven without being based on the operation for the accelerator pedal 70, the driving of the vehicle 10 by only the second driving force is prioritized. In the driving of the vehicle 10 by only the second driving force, the transmission 30 is not used, so that the large noise, the large vibration, or the like is less likely to occur. Thus, in the present embodiment, it is possible to provide the vehicle control device 28 that can improve the riding comfort.

Second Embodiment

A vehicle control device and a vehicle according to a second embodiment are described with reference FIGS. 14 to 23. The same components as those of the vehicle control device and the vehicle in the first embodiment shown in FIGS. 1 to 13 are donated by the same reference symbols, and the description thereof is omitted or simplified.

In a state where the vehicle 10 is driven by the second driving force, if it is determined that there is a step on the route of the vehicle 10, the vehicle control device 28 according to the present embodiment drives the vehicle 10 by at least the first driving force.

The determination unit 58 can determine whether there is a step on the route of the vehicle 10. When a change in speed of the vehicle 10 is less than a speed change threshold even though at least one of the first driving force and the second driving force is more than or equal to a driving force threshold, the determination unit 58 can determine that there is a step on the route of the vehicle 10. In addition, when the speed of the vehicle 10 is less than a predetermined value even though at least one of the first driving force and the second driving force is more than or equal to the driving force threshold, the determination unit 58 can determine that there is a step on the route of the vehicle 10.

The determination unit 58 can determine whether there is a step on the route of the vehicle 10, based on information obtained by the peripheral environment detection device 65.

When the change in speed of the vehicle 10 is more than or equal to the speed change threshold even though it is determined that there is a step on the route of the vehicle 10 on the basis of the information obtained by the peripheral environment detection device 65, the determination unit 58 performs the following process. In this case, the determination unit 58 can decrease the degree of reliability of the information obtained by the peripheral environment detection device 65. When the speed of the vehicle 10 is more than or equal to the predetermined value even though it is determined that there is a step on the route of the vehicle 10 on the basis of the information obtained by the peripheral environment detection device 65, the determination unit 58 performs the following process. In this case, the determination unit 58 can decrease the degree of reliability of the information obtained by the imaging device 68.

If the determination unit 58 determines that there is a step on the route of the vehicle 10 in the state where the vehicle 10 is driven by the second driving force, the control unit 56 drives the vehicle 10 by at least the first driving force. If the determination unit 58 determines that there is a step on the route of the vehicle 10 in the state where the vehicle 10 is driven by the second driving force, the control unit 56 may drive the vehicle 10 by the first driving force and the second driving force. In the present embodiment, the above control is performed because the maximum driving force of the second driving device 42 is relatively small while the maximum driving force of the first driving device 34 is sufficiently large. If the vehicle 10 is driven by the first driving force, the vehicle 10 can run over the step smoothly.

If the determination unit 58 determines that there is no step on the route of the vehicle 10 in the state where the vehicle 10 is driven by the second driving force, the control unit 56 maintains the state where the vehicle 10 is driven by the second driving force.

When the speed of the vehicle 10 has changed from a value more than or equal to a speed threshold to a value less than the speed threshold in the state where the vehicle 10 moves backward by the first driving force and the second driving force, the control unit 56 performs the following control. In this case, the control unit 56 makes a transition from the state where the vehicle 10 is driven by the first driving force and the second driving force to the state where the vehicle 10 is driven by the second driving force.

The control unit 56 can perform a plurality of operation modes, specifically, a first mode and a second mode. The first mode is a mode in which the energy storage device 20 is charged with electric power supplied from the first electric motor 14 by rotating the internal combustion engine 12, and the second electric motors 16, 18 are driven by electric power supplied from the energy storage device 20. The second mode is a mode in which the second electric motors 16, 18 are driven by the electric power supplied from the energy storage device 20 in the state where the internal combustion engine 12 is not rotated.

In a state where the first mode is performed, when the speed of the vehicle 10 driven by the first driving force and the second driving force has changed from a value more than or equal to the speed threshold to a value less than the speed threshold, the control unit 56 performs the following control. Moreover, in the state where the first mode is performed, when the target driving force has become less than the target driving force threshold, the control unit 56 performs the following control. In the above case, the control unit 56 makes a transition from the state where the vehicle 10 is driven by the first driving force and the second driving force to the state where the vehicle 10 is driven by the second driving force, and changes the operation mode from the first mode to the second mode.

When, after the vehicle 10 has been caused to travel in a first direction to thereby run over a step, the vehicle 10 is caused to travel in a second direction that is different from the first direction and thereby runs over the step again, the control unit 56 performs the following control. In this case, both when the vehicle 10 is caused to travel in the first direction to thereby run over the step and when the vehicle 10 is caused to travel in the second direction to thereby run over the step, the state where the vehicle 10 is driven by the first driving force and the second driving force is maintained.

Figure 14:
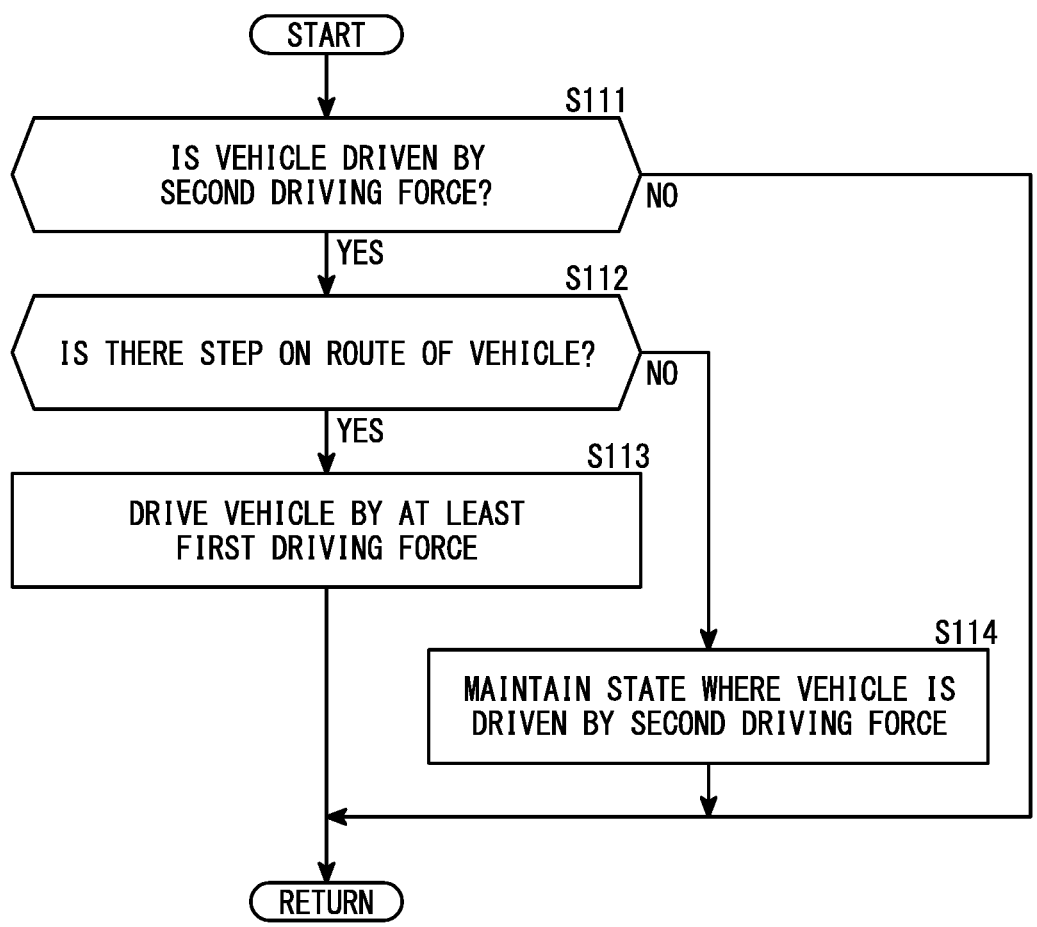
FIG. 14 is a flowchart showing one example of the operation of the vehicle control device according to a second embodiment.

FIG. 14 is a flowchart showing one example of the operation of the vehicle control device according to the present embodiment.

In step S111, the control unit 56 determines whether the vehicle 10 is driven by the second driving force. If the vehicle 10 is driven by the second driving force (step S111: YES), the process advances to step S112. If the vehicle 10 is not driven by the second driving force (step S111: NO), the process shown in FIG. 14 ends.

In step S112, the control unit 56 determines whether the determination unit 58 has determined that there is a step on the route of the vehicle 10. If the determination unit 58 has determined that there is a step on the route of the vehicle 10 (step S112: YES), the process advances to step S113. If the determination unit 58 has determined that there is no step on the route of the vehicle 10 (step S112: NO), the process advances to step S114.

In step S113, the control unit 56 drives the vehicle 10 by at least the first driving force.

In step S114, the control unit 56 maintains the state where the vehicle 10 is driven by the second driving force. Then, the process shown in FIG. 14 ends.

Figure 15:
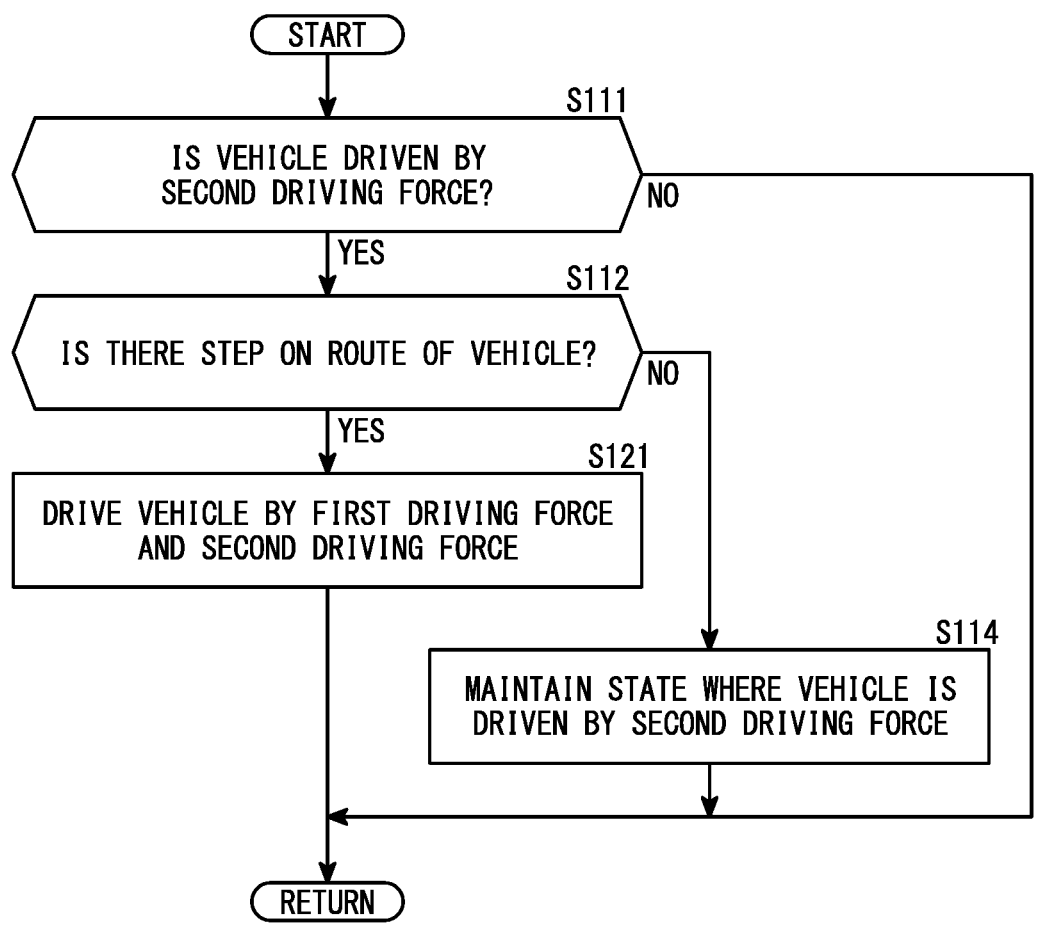
FIG. 15 is a flowchart showing one example of the operation of the vehicle control device according to the second embodiment.

FIG. 15 is a flowchart showing one example of the operation of the vehicle control device according to the present embodiment.

Since steps S111, S112 are similar to steps S111, S112 described above with reference to FIG. 14, the description thereof is omitted. If the determination unit 58 determines that there is a step on the route of the vehicle 10 (step S112: YES), the process advances to step S121. If the determination unit 58 determines that there is no step on the route of the vehicle 10 (step S112: NO), the process advances to step S114.

In step S121, the control unit 56 drives the vehicle 10 by the first driving force and the second driving force.

Since step S114 is similar to step S114 described above with reference to FIG. 14, the description thereof is omitted. Then, the process shown in FIG. 15 ends.

Figure 16:
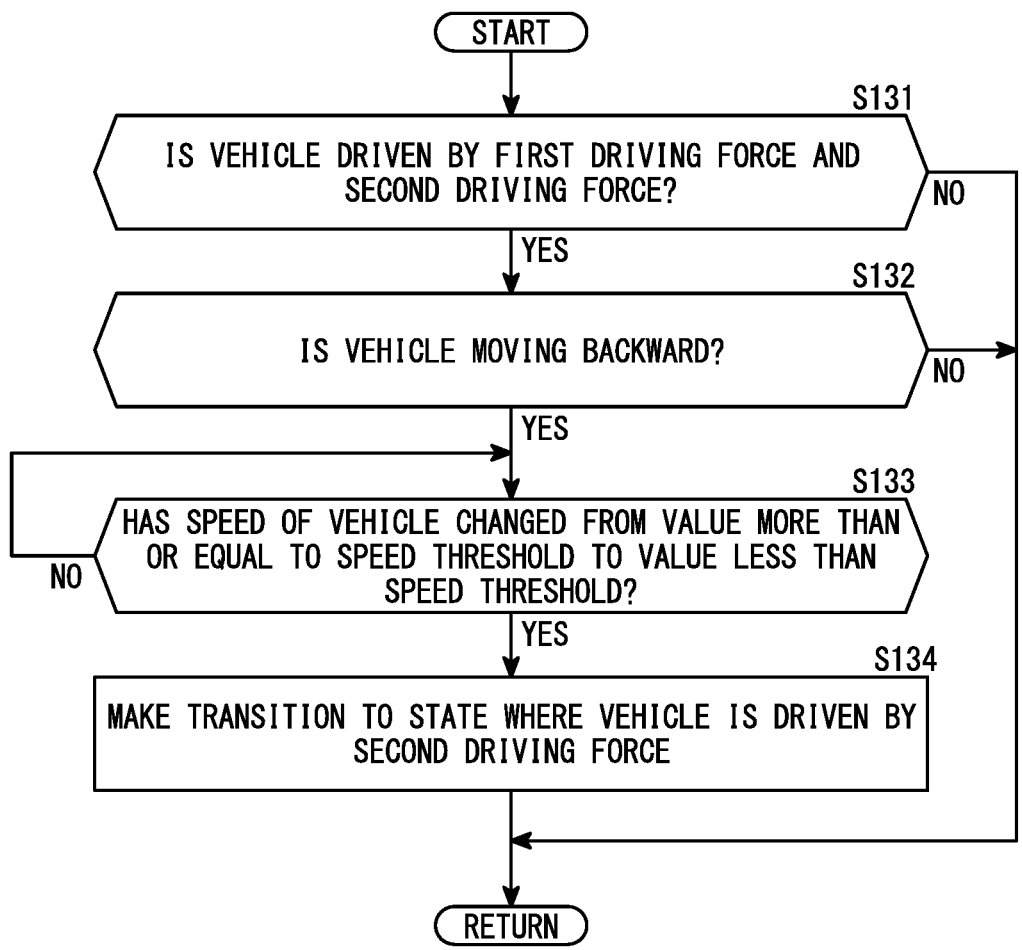
FIG. 16 is a flowchart showing one example of the operation of the vehicle control device according to the second embodiment.

FIG. 16 is a flowchart showing one example of the operation of the vehicle control device according to the present embodiment.

In step S131, the control unit 56 determines whether the vehicle 10 is driven by the first driving force and the second driving force. If the vehicle 10 is driven by the first driving force and the second driving force (step S131: YES), the process advances to step S132. If the vehicle 10 is not driven by the first driving force and the second driving force (step S131: NO), the process shown in FIG. 16 ends.

In step S132, the control unit 56 determines whether the vehicle 10 is moving backward. If the vehicle 10 is moving backward (step S132: YES), the process advances to step S133. If the vehicle 10 is not moving backward (step S132: NO), the process shown in FIG. 16 ends.

In step S133, the control unit 56 determines whether the speed of the vehicle 10 has changed from a value more than or equal to the speed threshold to a value less than the speed threshold. If the speed of the vehicle 10 has changed from a value more than or equal to the speed threshold to a value less than the speed threshold (step S133: YES), the process advances to step S134. If the speed of the vehicle 10 has not changed from a value more than or equal to the speed threshold to a value less than the speed threshold (step S133: NO), the process in step S133 is repeated.

In step S134, the control unit 56 makes a transition to the state where the vehicle 10 is driven by the second driving force. Then, the process shown in FIG. 16 ends.

Figure 17:
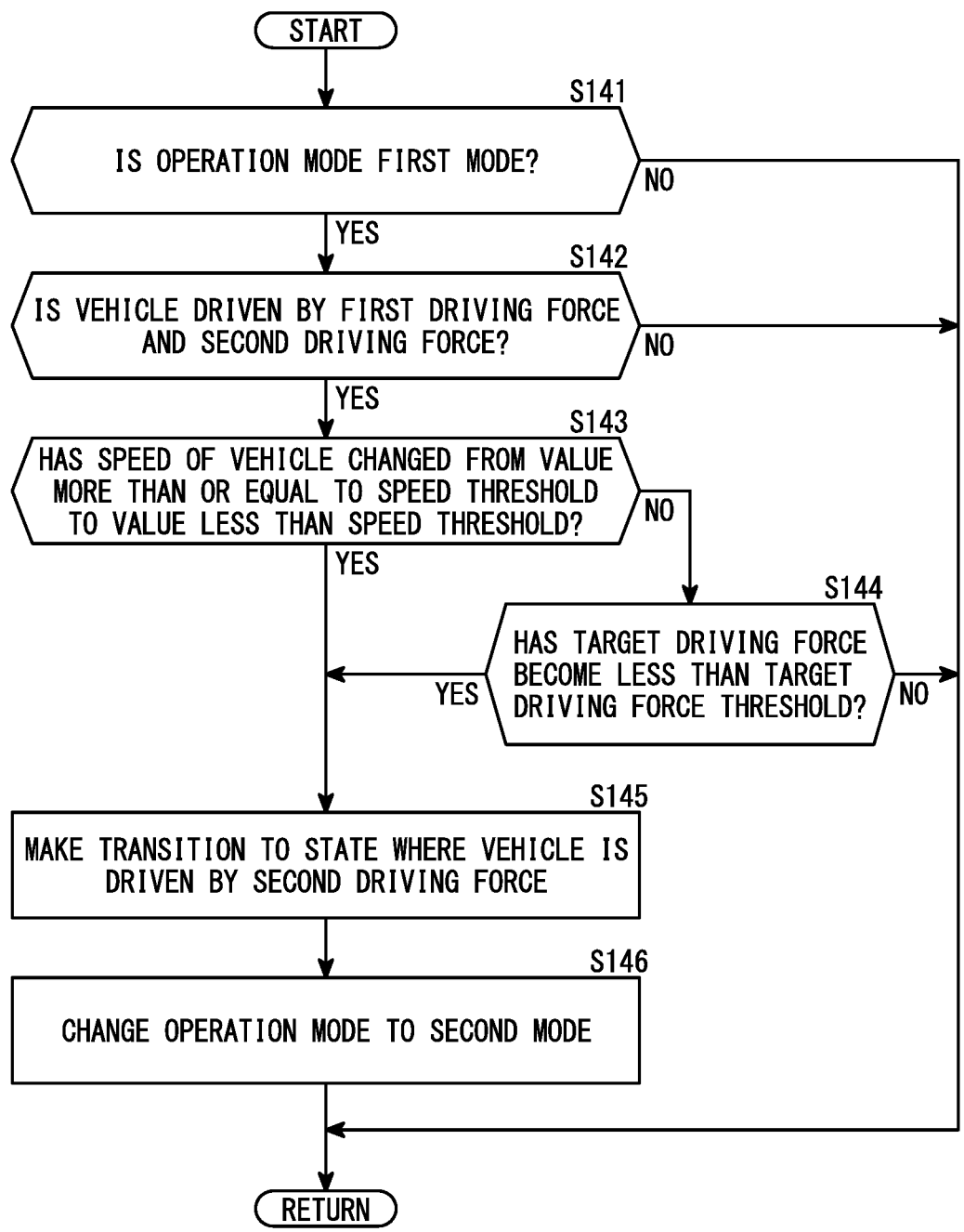
FIG. 17 is a flowchart showing one example of the operation of the vehicle control device according to the second embodiment.

FIG. 17 is a flowchart showing one example of the operation of the vehicle control device according to the present embodiment.

In step S141, the control unit 56 determines whether the operation mode is the first mode. If the operation mode is the first mode (step S141: YES), the process advances to step S142. If the operation mode is not the first mode (step S141: NO), the process shown in FIG. 17 ends.

In step S142, the control unit 56 determines whether the vehicle 10 is driven by the first driving force and the second driving force. If the vehicle 10 is driven by the first driving force and the second driving force (step S142: YES), the process advances to step S143. If the vehicle 10 is not driven by the first driving force and the second driving force (step S142: NO), the process shown in FIG. 17 ends.

In step S143, the control unit 56 determines whether the speed of the vehicle 10 has changed from a value more than or equal to the speed threshold to a value less than the speed threshold. If the speed of the vehicle 10 has changed from a value more than or equal to the speed threshold to a value less than the speed threshold (step S143: YES), the process advances to step S145. If the speed of the vehicle 10 has not changed from a value more than or equal to the speed threshold to a value less than the speed threshold (step S143: NO), the process advances to step S144.

In step S144, the control unit 56 determines whether the target driving force has become less than the target driving force threshold. If the target driving force has become less than the target driving force threshold (step S144: YES), the process advances to step S145. If the target driving force has not become less than the target driving force threshold (step S144: NO), the process shown in FIG. 17 ends.

In step S145, the control unit 56 makes a transition to the state where the vehicle 10 is driven by the second driving force. After that, the process advances to step S146.

In step S146, the control unit 56 changes the operation mode to the second mode. Then, the process shown in FIG. 17 ends.

Figure 18:
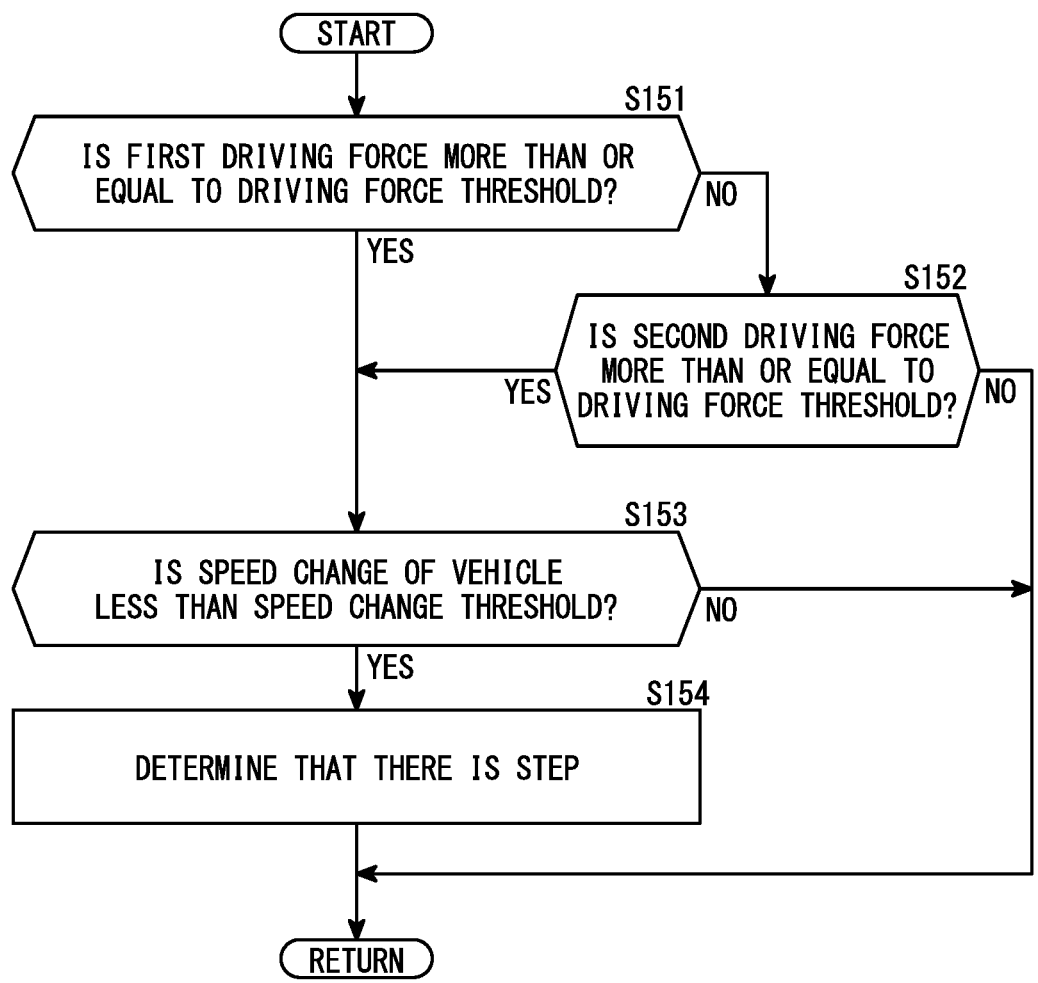
FIG. 18 is a flowchart showing one example of the operation of the vehicle control device according to the second embodiment.

FIG. 18 is a flowchart showing one example of the operation of the vehicle control device according to the present embodiment.

In step S151, the determination unit 58 determines whether the first driving force is more than or equal to the driving force threshold or not (i.e., whether the first driving force the driving force threshold). If the first driving force is more than or equal to the driving force threshold (step S151: YES), the process advances to step S153. If the first driving force is less than the driving force threshold (step S151: NO), the process advances to step S152.

In step S152, the determination unit 58 determines whether the second driving force is more than or equal to the driving force threshold or not (i.e., whether the second driving force the driving force threshold). If the second driving force is more than or equal to the driving force threshold (step S152: YES), the process advances to step S153. If the second driving force is less than the driving force threshold (step S152: NO), the process shown in FIG. 18 ends.

In step S153, the determination unit 58 determines whether a change in speed (speed change) of the vehicle 10 is less than the speed change threshold. If the speed change of the vehicle 10 is less than the speed change threshold (step S153: YES), the process advances to step S154. If the speed change of the vehicle 10 is more than or equal to the speed change threshold (step S153: NO), the process shown in FIG. 18 ends.

In step S154, the determination unit 58 determines that there is a step on the route of the vehicle 10.

Figure 19:
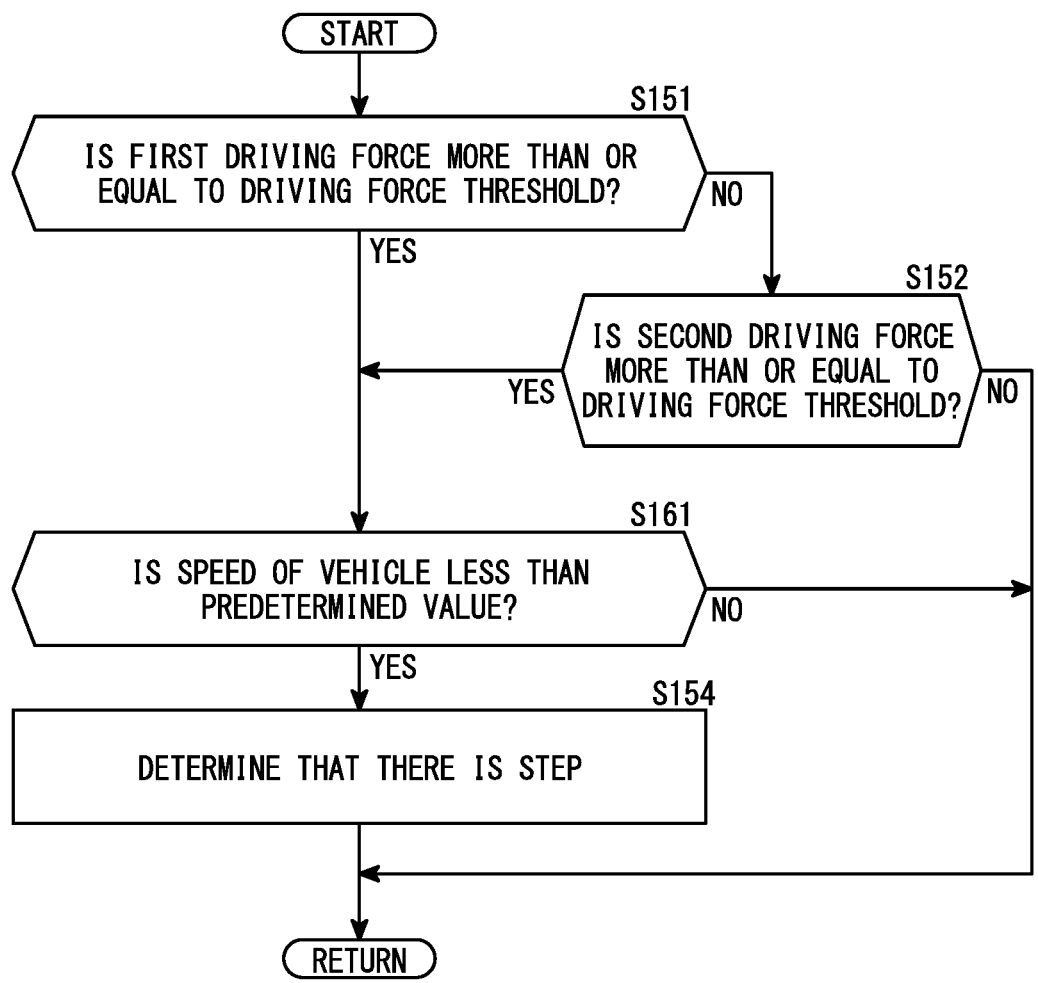
FIG. 19 is a flowchart showing one example of the operation of the vehicle control device according to the second embodiment.

FIG. 19 is a flowchart showing one example of the operation of the vehicle control device according to the present embodiment.

Since steps S151, S152 are similar to steps S151, S152 described above with reference to FIG. 18, the description thereof is omitted. If the first driving force is more than or equal to the driving force threshold (step S151: YES), the process advances to step S161. If the second driving force is more than or equal to the driving force threshold (step S152: YES), the process advances to step S161.

In step S161, the determination unit 58 determines whether the speed of the vehicle 10 is less than the predetermined value. If the speed of the vehicle 10 is less than the predetermined value (step S161: YES), the process advances to step S154. If the speed of the vehicle 10 is more than or equal to the predetermined value (step S161: NO), the process shown in FIG. 19 ends.

Since step S154 is similar to step S154 described above with reference to FIG. 18, the description thereof is omitted. Then, the process shown in FIG. 19 ends.

Figure 20:
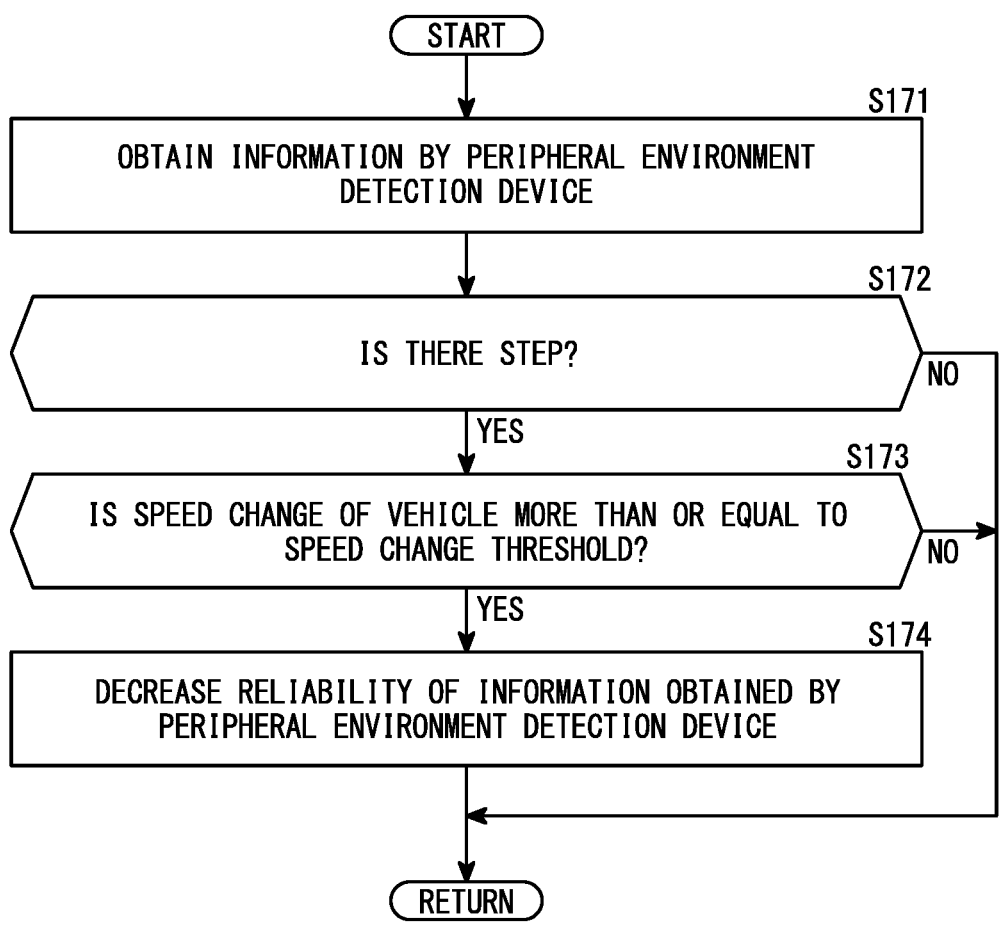
FIG. 20 is a flowchart showing one example of the operation of the vehicle control device according to the second embodiment.

FIG. 20 is a flowchart showing one example of the operation of the vehicle control device according to the present embodiment.

In step S171, the peripheral environment detection device 65 obtains the information. After that, the process advances to step S172.

In step S172, the determination unit 58 determines whether there is a step on the route of the vehicle 10, on the basis of the information obtained by the peripheral environment detection device 65. If it is determined that there is a step on the route of the vehicle 10 (step S172: YES), the process advances to step S173. If it is determined that there is no step on the route of the vehicle 10 (step S172: NO), the process shown in FIG. 20 ends.

In step S173, the determination unit 58 determines whether the speed change of the vehicle 10 is more than or equal to the speed change threshold or not (i.e., whether the speed change the speed change threshold). If it is determined that the speed change of the vehicle 10 is more than or equal to the speed change threshold (step S173: YES), the process advances to step S174. If it is determined that the speed change of the vehicle 10 is less than the speed change threshold (step S173: NO), the process shown in FIG. 20 ends.

In step S174, the determination unit 58 decreases the reliability (degree of reliability) of the information obtained by the peripheral environment detection device 65. Then, the process shown in FIG. 20 ends.

Figure 21:
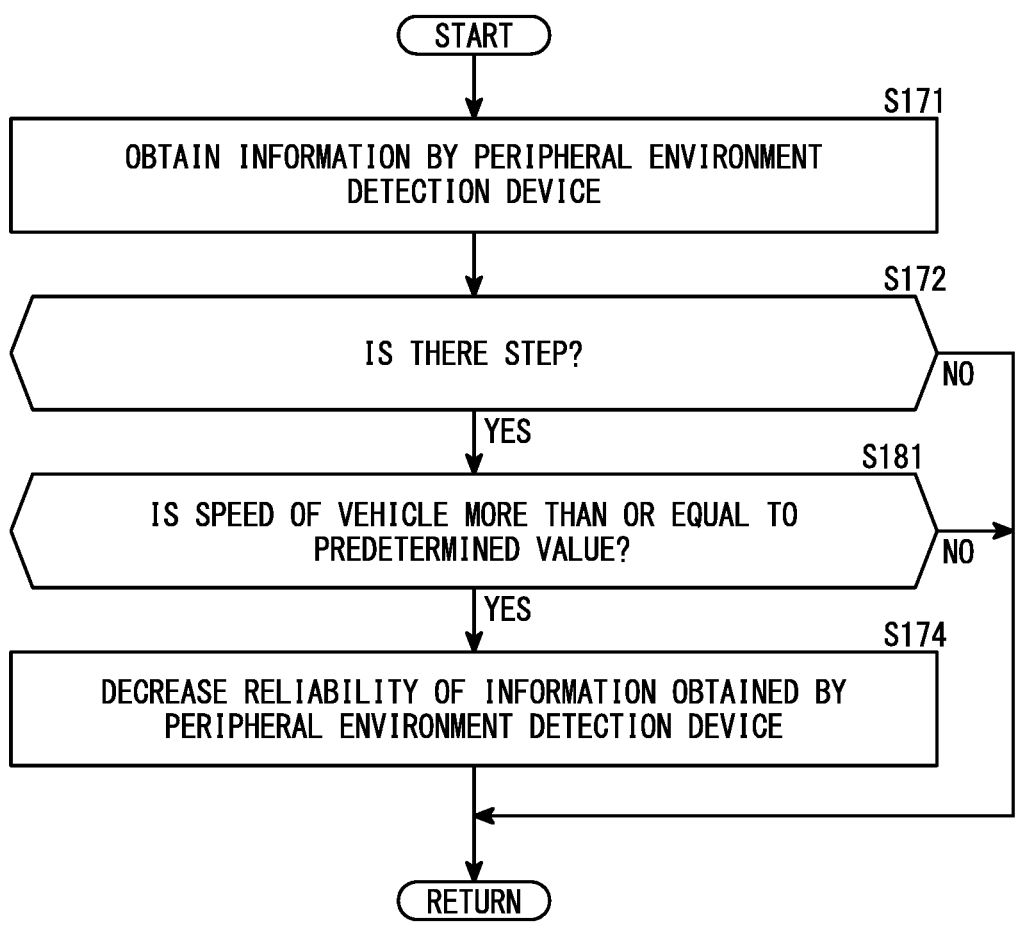
FIG. 21 is a flowchart showing one example of the operation of the vehicle control device according to the second embodiment.

FIG. 21 is a flowchart showing one example of the operation of the vehicle control device according to the present embodiment.

Since steps S171, S172 are similar to steps S171, S172 described above with reference to FIG. 20, the description thereof is omitted. If it is determined that there is a step on the route of the vehicle 10 (step S172: YES), the process advances to step S181.

In step S181, the determination unit 58 determines whether the speed of the vehicle 10 is more than or equal to the predetermined value or not (i.e., whether the speed the predetermined value). If it is determined that the speed of the vehicle 10 is more than or equal to the predetermined value (step S181: YES), the process advances to step S174. If it is determined that the speed of the vehicle 10 is less than the predetermined value (step S181: NO), the process shown in FIG. 21 ends.

Since step S174 is similar to step S174 described above with reference to FIG. 20, the description thereof is omitted. Then, the process shown in FIG. 21 ends.

Figure 22:
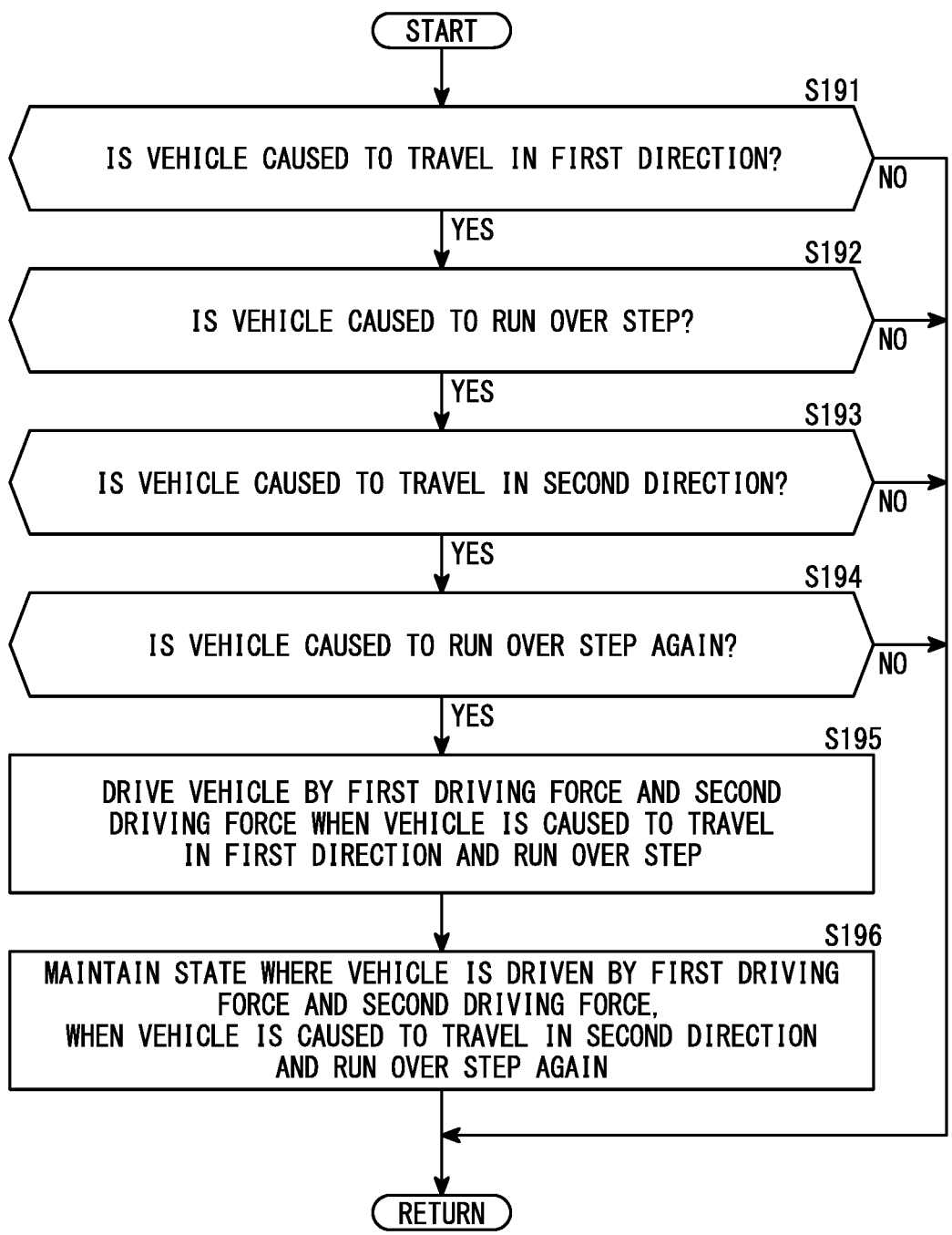
FIG. 22 is a flowchart showing one example of the operation of the vehicle control device according to the second embodiment.

FIG. 22 is a flowchart showing one example of the operation of the vehicle control device according to the present embodiment.

In step S191, the control unit 56 determines whether the vehicle 10 is caused to travel in the first direction. If the vehicle 10 is caused to travel in the first direction (step S191: YES), the process advances to step S192. If the vehicle 10 is not caused to travel in the first direction (step S191: NO), the process shown in FIG. 22 ends.

In step S192, the control unit 56 determines whether the vehicle 10 is caused to run over the step by traveling in the first direction. If the vehicle 10 is caused to run over the step by traveling in the first direction (step S192: YES), the process advances to step S193. If the vehicle 10 is not caused to run over the step by traveling in the first direction (step S192: NO), the process shown in FIG. 22 ends.

In step S193, the control unit 56 determines whether, after the vehicle 10 travels in the first direction and runs over the step, the vehicle 10 is caused to travel in the second direction that is different from the first direction. If, after the vehicle 10 travels in the first direction and runs over the step, the vehicle 10 is caused to travel in the second direction that is different from the first direction (step S193: YES), the process advances to step S194. If, after the vehicle 10 travels in the first direction and runs over the step, the vehicle 10 is not caused to travel in the second direction that is different from the first direction (step S193: NO), the process shown in FIG. 22 ends.

In step S194, it is determined whether the vehicle 10 is caused to run over the step again by traveling in the second direction. If the vehicle 10 is caused to run over the step again by traveling in the second direction (step S194: YES), the process advances to step S195. If the vehicle 10 is not caused to run over the step again by traveling in the second direction (step S194: NO), the process shown in FIG. 22 ends.

In step S195, when the vehicle 10 travels in the first direction and runs over the step, the control unit 56 drives the vehicle 10 by the first driving force and the second driving force. After that, the process advances to step S196.

In step S196, when the vehicle 10 travels in the second direction and runs over the step again, the control unit 56 maintains the state where the vehicle 10 is driven by the first driving force and the second driving force.

Then, the process shown in FIG. 22 ends.

Figure 23:
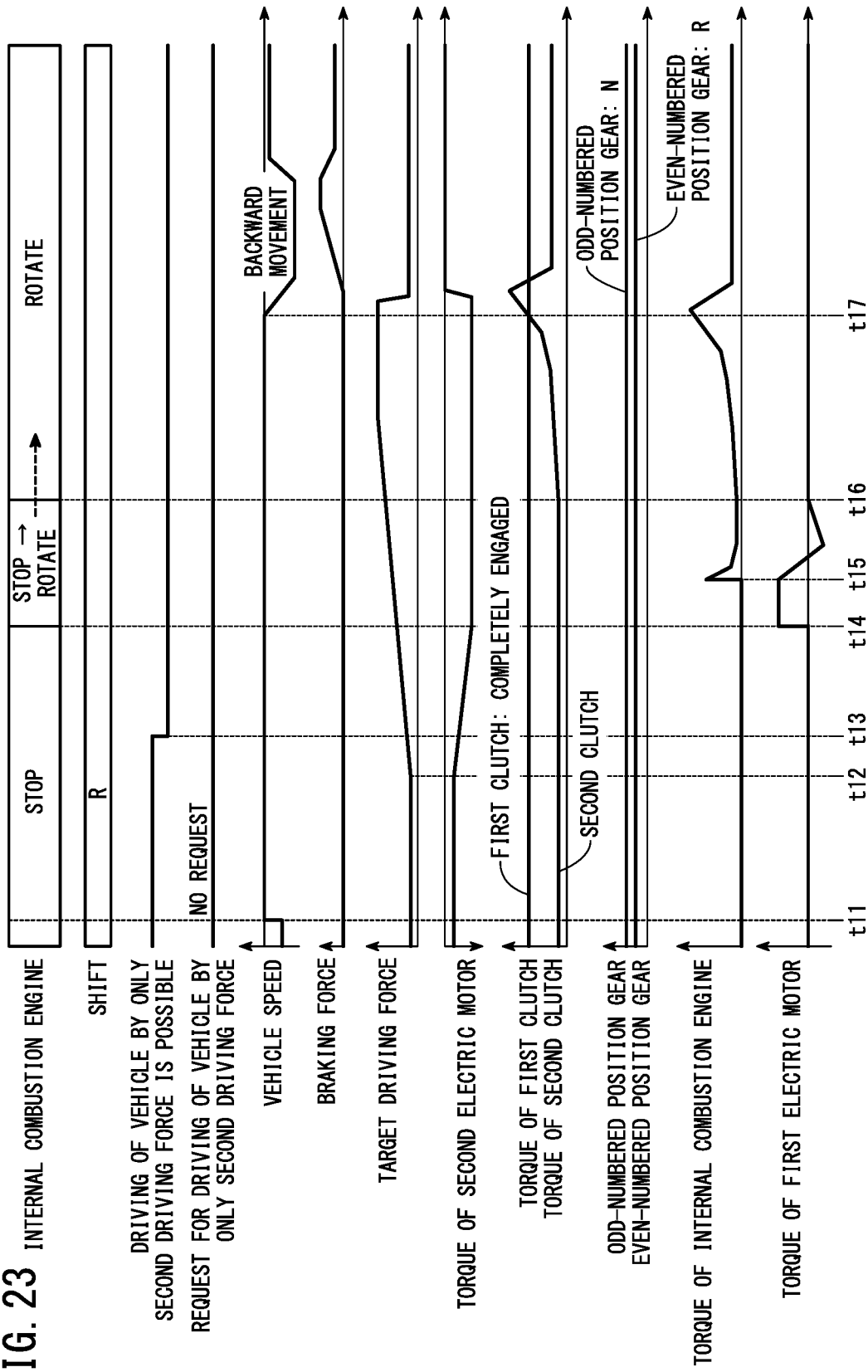
FIG. 23 is a time chart showing one example of the operation of the vehicle control device according to the second embodiment.

FIG. 23 is a time chart showing one example of the operation of the vehicle control device according to the present embodiment. The time chart shown in FIG. 23 corresponds to the operation that is described above with reference to FIG. 14. FIG. 23 illustrates the operation when the vehicle 10 moving backward has stopped by a step.

A situation at a timing t11 is as follows. That is to say, the internal combustion engine 12 is stopped. The shift is set to the R (reverse). The determination unit 58 has determined that the vehicle 10 can be driven by only the second driving force. The request for driving the vehicle 10 by only the second driving force is not issued. The vehicle speed is zero. The braking force is zero. The target driving force is a relatively small value. The torque of the second electric motors 16, 18 is a relatively small value.

The first clutch 102 is engaged completely. The second clutch 104 is not engaged. The odd-numbered position gear is set to the N (neutral). The even-numbered position gear is set to the R (reverse). The torque of the internal combustion engine 12 is zero. The torque of the first electric motor 14 is zero.

At a timing t12, the target driving force starts to increase, and in accordance with this, the torque of the second electric motors 16, 18 starts to increase.

At a timing t13, the determination unit 58 determines that the vehicle 10 cannot be driven by only the second driving force.

At a timing t14, the vehicle control device 28 increases the torque of the first electric motor 14 in order to start the internal combustion engine 12.

As at timing t15, the internal combustion engine 12 starts to rotate.

At a timing t16, the second clutch 104 is engaged.

At a timing t17, the torque reaches a torque value enough to run over the step, and the vehicle 10 starts again to move backward.

As described above, in the present embodiment, in the state where the vehicle 10 is driven by the second driving force, if the determination unit 58 determines that there is a step on the route of the vehicle 10, the control unit 56 drives the vehicle 10 by at least the first driving force. If there is a step, then the first driving force is used. Thus, the vehicle 10 can run over the step for sure. On the other hand, if there is no step, the vehicle 10 is driven by the second driving force. Thus, the noise and the vibration are small. Therefore, in the present embodiment, it is possible to provide the vehicle control device 28 that can improve the riding comfort while securing the driving force that is needed to run over the step.

The preferred embodiments according to the present invention are described above. However, the present invention is not limited to the above embodiments, and can be changed freely within the range not departing from the concept of the present invention.

For example, in the above embodiments, the first electric motor 14 can assist the motive power of the internal combustion engine 12; however, the present invention is not limited to this example. The first electric motor 14 may not assist the motive power of the internal combustion engine 12.

The above embodiments can be summarized as follows.

The vehicle control device (28) controls the vehicle (10) including the first driving device (34), the second driving device (42), and the energy storage device (20), the first driving device (34) including the internal combustion engine (12) and the first electric motor (14) configured to generate electricity by being rotated by the internal combustion engine, the first driving device being configured to drive one set of the set of first driving wheels (32) and the set of second driving wheels (36) through the transmission (30); the second driving device (42) including the second electric motor (16, 18) and being configured to drive the other set of the set of first driving wheels and the set of second driving wheels; the energy storage device (20) being configured to store the electric power supplied from the first electric motor and supply the electric power to the first electric motor and the second electric motor, and the vehicle control device includes: the target driving force decision unit (55) configured to decide the target driving force of the vehicle; and the control unit (56) configured to control at least one of the first driving force, which is the driving force of the first driving device, and the second driving force, which is the driving force of the second driving device, based on the target driving force, and when the amount of the electric power stored in the energy storage device has become less than the electric power amount threshold, cause the first electric motor to generate electricity by rotation of the internal combustion engine. In the state where the first electric motor generates electricity by rotation of the internal combustion engine and the target driving force is decided by the target driving force decision unit based on the user's operation for the accelerator pedal (70), the control unit is configured to perform the first driving control in which driving of the vehicle by the first driving force is prioritized, and in the state where the first electric motor generates electricity by rotation of the internal combustion engine and the target driving force is decided by the target driving force decision unit without being based on the user's operation for the accelerator pedal, the control unit is configured to perform the second driving control in which driving of the vehicle by the second driving force is prioritized. When the vehicle is driven without being based on the operation for the accelerator pedal, if the noise, the vibration, or the like occurs, the user feels uncomfortable. However, in the above structure, when the vehicle 10 is driven without being based on the operation for the accelerator pedal, driving of the vehicle by only the second driving force is prioritized. In the driving of the vehicle by only the second driving force, the transmission is not used, so that the large noise, the large vibration, or the like is less likely to occur. Thus, in the above structure, it is possible to provide the vehicle control device that can improve the riding comfort.

In the state where the internal combustion engine does not rotate and the vehicle is driven by the second driving force, when the amount of the electric power stored in the energy storage device has become less than the electric power amount threshold, the control unit may start to rotate the internal combustion engine to thereby start electric power generation by the first electric motor, and continue driving of the vehicle by the second driving force. In the above structure, driving of the vehicle by the second driving force is continued. Thus, it is possible to suppress the user's uncomfortable feeling, that is, it is possible to improve the riding comfort.

The state where the target driving force is decided by the target driving force decision unit without being based on the user's operation for the accelerator pedal is the state where the target driving force may be decided by the target driving force decision unit on the basis of the information from the parking control device (79) configured to assist the vehicle in parking.

The maximum driving force of the first driving device is greater than the maximum driving force of the second driving device. In the state where the vehicle is driven by the second driving force, when the target driving force has become more than or equal to the target driving force threshold, or in the state where the vehicle is driven by the second driving force, when the target driving force has become more than or equal to the maximum driving force of the second driving device, the control unit is configured to make a transition from the state where the vehicle is driven by the second driving force to the state where the vehicle is driven by at least the first driving force. In the above structure, the first driving force that is relatively large is used as necessary. Thus, the vehicle can be driven for sure.

In the state where the internal combustion engine rotates, the vehicle is driven by the first driving force, and the target driving force is decided by the target driving force decision unit without being based on the user's operation for the accelerator pedal, when the amount of the electric power stored in the energy storage device has changed from a value less than the electric power amount threshold to a value more than or equal to the electric power amount threshold, the control unit may continue the rotation of the internal combustion engine. In the above structure, in the state where the vehicle is driven by the first driving force, even when the amount of the electric power stored in the energy storage device has become more than or equal to the electric power amount threshold, the internal combustion engine continues to rotate. Thus, it is possible to suppress the user's uncomfortable feeling.

In the state where the internal combustion engine rotates, the vehicle is driven by the second driving force, and the target driving force is decided by the target driving force decision unit without being based on the user's operation for the accelerator pedal, when the amount of the electric power stored in the energy storage device has changed from a value less than the electric power amount threshold to a value more than or equal to the electric power amount threshold, the control unit may stop the rotation of the internal combustion engine. In the above structure, in the state where the vehicle is driven by the second driving force, when the amount of the electric power stored in the energy storage device has become more than or equal to the electric power amount threshold, the internal combustion engine stops rotating. Thus, it is possible to suppress the vibration and the noise.

The transmission includes the plurality of gears, the number of gears meshed when the vehicle moves backward is greater than the number of gears meshed when the vehicle moves forward, and when the speed of the vehicle that is moving backward by the first driving force has changed from a value more than or equal to the first speed threshold to a value less than the first speed threshold, the control unit may continue the rotation of the internal combustion engine and make a transition from the state where the vehicle is driven by the first driving force to the state where the vehicle is driven by the second driving force and then, stop the rotation of the internal combustion engine when the speed of the vehicle has become less than the second speed threshold that is smaller than the first speed threshold. In the above structure, it is possible to prevent the user from feeling uncomfortable.

In the state where the vehicle is driven by the second driving force and the target driving force is decided by the target driving force decision unit without being based on the user's operation for the accelerator pedal, when a skid has occurred on the other set of the set of first driving wheels and the set of second driving wheels, the control unit may drive the vehicle by the first driving force and the second driving force. In the above structure, when a skid or slip has occurred, the vehicle is driven by the first driving force and the second driving force. Thus, the vehicle can be driven for sure.

The vehicle includes the above vehicle control device.

What is claimed is:

1. A vehicle control device configured to control a vehicle including a first driving device configured to only drive a first set of driving wheels through a transmission, a second driving device configured to only drive a second set of driving wheels without a transmission, and an energy storage device, the first driving device including an internal combustion engine and a first electric motor configured to generate electricity by being rotated by the internal combustion engine, the second driving device including a second electric motor, the energy storage device being configured to store electric power supplied from the first electric motor and supply the electric power to the first electric motor and the second electric motor, the vehicle control device comprising one or more processors, wherein:

the one or more processors are configured to decide a target driving force of the vehicle;

the one or more processors are configured to control at least one of a first driving force, which is a driving force of the first driving device, and a second driving force, which is a driving force of the second driving device, based on the target driving force, and when an amount of electric power stored in the energy storage device has become less than an electric power amount threshold, the one or more processors are configured to cause the first electric motor to generate electricity by rotation of the internal combustion engine;

in a state where the first electric motor generates electricity by rotation of the internal combustion engine and the target driving force is decided based on user's operation for an accelerator pedal, the one or more processors are configured to perform a first driving control in which driving of the vehicle by the first driving force is prioritized; and in a state where the first electric motor generates electricity by rotation of the internal combustion engine and the target driving force is decided without being based on the user's operation for the accelerator pedal, the one or more processors are configured to perform a second driving control in which driving of the vehicle by the second driving force is prioritized.

2. The vehicle control device according to claim 1, wherein, in a state where the internal combustion engine does not rotate and the vehicle is driven by the second driving force, when the amount of the electric power stored in the energy storage device has become less than the electric power amount threshold, the one or more processors are configured to start to rotate the internal combustion engine to thereby start electric power generation by the first electric motor, and continue driving of the vehicle by the second driving force.

3. The vehicle control device according to claim 1, wherein the state where the target driving force is decided without being based on the user's operation for the accelerator pedal is a state where the target driving force is decided based on information from a parking control device configured to assist the vehicle in parking.

4. The vehicle control device according to claim 1, wherein:
 a maximum driving force of the first driving device is greater than a maximum driving force of the second driving device; and
 in a state where the vehicle is driven by the second driving force, when the target driving force has become more than or equal to a target driving force threshold, or in the state where the vehicle is driven by the second driving force, when the target driving force has become more than or equal to the maximum driving force of the second driving device, the one or more processors are configured to make a transition from the state where the vehicle is driven by the second driving force to a state where the vehicle is driven by at least the first driving force.

5. The vehicle control device according to claim 1, wherein in a state where the internal combustion engine rotates, the vehicle is driven by the first driving force, and the target driving force is decided without being based on the user's operation for the accelerator pedal, when the amount of the electric power stored in the energy storage device has changed from a value less than the electric power amount threshold to a value more than or equal to the electric power amount threshold, the one or more processors are configured to continue rotation of the internal combustion engine.

6. The vehicle control device according to claim 1, wherein, in a state where the internal combustion engine rotates, the vehicle is driven by the second driving force, and the target driving force is decided without being based on the user's operation for the accelerator pedal, when the amount of the electric power stored in the energy storage device has changed from a value less than the electric power amount threshold to a value more than or equal to the electric power amount threshold, the one or more processors are configured to stop rotation of the internal combustion engine.

7. The vehicle control device according to claim 1, wherein:
 the transmission includes a plurality of gears;
 a number of gears meshed when the vehicle moves backward, among the plurality of gears, is greater than a number of gears meshed when the vehicle moves forward, among the plurality of gears; and
 when a speed of the vehicle that is moving backward by the first driving force has changed from a value more than or equal to a first speed threshold to a value less than the first speed threshold, the one or more processors are configured to continue rotation of the internal combustion engine and make a transition from a state where the vehicle is driven by the first driving force to a state where the vehicle is driven by the second driving force and then, stop the rotation of the internal combustion engine when the speed of the vehicle has become less than a second speed threshold that is smaller than the first speed threshold.

8. The vehicle control device according to claim 1, wherein, in a state where the vehicle is driven by the second driving force and the target driving force is decided without being based on the user's operation for the accelerator pedal, when a skid has occurred on the second set of driving wheels, the one or more processors are configured to drive the vehicle by the first driving force and the second driving force.

9. A vehicle comprising a vehicle control device, the vehicle control device being configured to control the vehicle including a first driving device configured to only drive a first set of driving wheels through a transmission, a second driving device configured to only drive a second set of driving wheels without a transmission, and an energy storage device, the first driving device including an internal combustion engine and a first electric motor configured to generate electricity by being rotated by the internal combustion engine, the second driving device including a second electric motor, the energy storage device being configured to store electric power supplied from the first electric motor and supply the electric power to the first electric motor and the second electric motor, the vehicle control device comprising one or more processors, wherein:
 the one or more processors are configured to decide a target driving force of the vehicle;
 the one or more processors are configured to control at least one of a first driving force, which is a driving force of the first driving device, and a second driving force, which is a driving force of the second driving device, based on the target driving force, and when an amount of electric power stored in the energy storage device has become less than an electric power amount threshold, the one or more processors are configured to cause the first electric motor to generate electricity by rotation of the internal combustion engine;
 in a state where the first electric motor generates electricity by rotation of the internal combustion engine and the target driving force is decided based on user's operation for an accelerator pedal, the one or more processors are configured to perform a first driving control in which driving of the vehicle by the first driving force is prioritized; and
 in a state where the first electric motor generates electricity by rotation of the internal combustion engine and the target driving force is decided without being based on the user's operation for the accelerator pedal, the one or more processors are configured to perform a second driving control in which driving of the vehicle by the second driving force is prioritized.

10. A vehicle control device configured to control a vehicle including a first driving device configured to only drive a first set of driving wheels through a transmission, a second driving device configured to only drive a second set of driving wheels without a transmission, and an energy storage device, the first driving device including an internal combustion engine and a first electric motor configured to generate electricity by being rotated by the internal combustion engine, the second driving device including a second electric motor, the energy storage device being configured to store electric power supplied from the first electric motor and supply the electric power to the first electric motor and the second electric motor, the transmission including a plurality of gears in a manner that a number of gears meshed is greater when the vehicle moves in one direction than a number of gears meshed when the vehicle moves in another direction, the vehicle control device comprising one or more processors, wherein:

the one or more processors are configured to decide a target driving force of the vehicle;

the one or more processors are configured to control at least one of a first driving force, which is a driving force of the first driving device, and a second driving force, which is a driving force of the second driving device, based on the target driving force, and when an amount of electric power stored in the energy storage device has become less than an electric power amount threshold, the one or more processors are configured to cause the first electric motor to generate electricity by rotation of the internal combustion engine;

in a state where the vehicle moves in the another direction, the first electric motor generates electricity by rotation of the internal combustion engine and the target driving force is decided based on user's operation for an accelerator pedal, the one or more processors are configured to perform a first driving control in which driving of the vehicle by the first driving force is prioritized; and in a state where the vehicle moves in the another direction, the first electric motor generates electricity by rotation of the internal combustion engine and the target driving force is decided without being based on the user's operation for the accelerator pedal, the one or more processors are configured to perform a second driving control in which driving of the vehicle by the second driving force is prioritized.

* * * * *